(12) United States Patent
Bunch

(10) Patent No.: US 8,471,812 B2
(45) Date of Patent: Jun. 25, 2013

(54) POINTING AND IDENTIFICATION DEVICE

(75) Inventor: Jesse C. Bunch, Silver Spring, MD (US)

(73) Assignee: Jesse C. Bunch, Silver Spring, MD (US)

(*) Notice: Subject to any disclaimer, the term of this patent is extended or adjusted under 35 U.S.C. 154(b) by 2038 days.

(21) Appl. No.: 11/233,043

(22) Filed: Sep. 23, 2005

(65) Prior Publication Data
US 2009/0267895 A1 Oct. 29, 2009

(51) Int. Cl.
*G06F 3/033* (2006.01)

(52) U.S. Cl.
USPC ............................ 345/157; 345/156; 382/209

(58) Field of Classification Search
USPC ............................ 345/156–184; 382/181–231
See application file for complete search history.

(56) References Cited

U.S. PATENT DOCUMENTS

| | | | |
|---|---|---|---|
| 5,835,078 A * | 11/1998 | Arita et al. | 345/158 |
| 5,933,531 A * | 8/1999 | Lorie | 382/229 |
| 6,430,554 B1 | 8/2002 | Rothschild | |
| 6,651,053 B1 | 11/2003 | Rothschild | |
| 6,675,165 B1 | 1/2004 | Rothschild | |
| 6,766,363 B1 | 7/2004 | Rothschild | |
| 7,634,448 B1 * | 12/2009 | Ramachandran | 705/79 |
| 2004/0148277 A1 * | 7/2004 | Gray | 707/3 |
| 2004/0208372 A1 * | 10/2004 | Boncyk et al. | 382/181 |
| 2005/0138630 A1 * | 6/2005 | Reynolds | 719/310 |
| 2005/0138674 A1 * | 6/2005 | Howard et al. | 725/136 |
| 2006/0251339 A1 * | 11/2006 | Gokturk et al. | 382/305 |

OTHER PUBLICATIONS

International Preliminary Report on Patentability in International Application No. PCT/US2006/036795, issued Jun. 24, 2008.

* cited by examiner

*Primary Examiner* — Dmitriy Bolotin
(74) *Attorney, Agent, or Firm* — Blank Rome LLP

(57) ABSTRACT

A pointing and identification device (PID) allows the user to point at objects in the real world, on television or movie screens, or otherwise not on the computer screen. The PID includes a digital camera and one or both of a laser and a reticle for aiming the digital camera. An image taken with the digital camera is transmitted to a computer or the like.

12 Claims, 11 Drawing Sheets

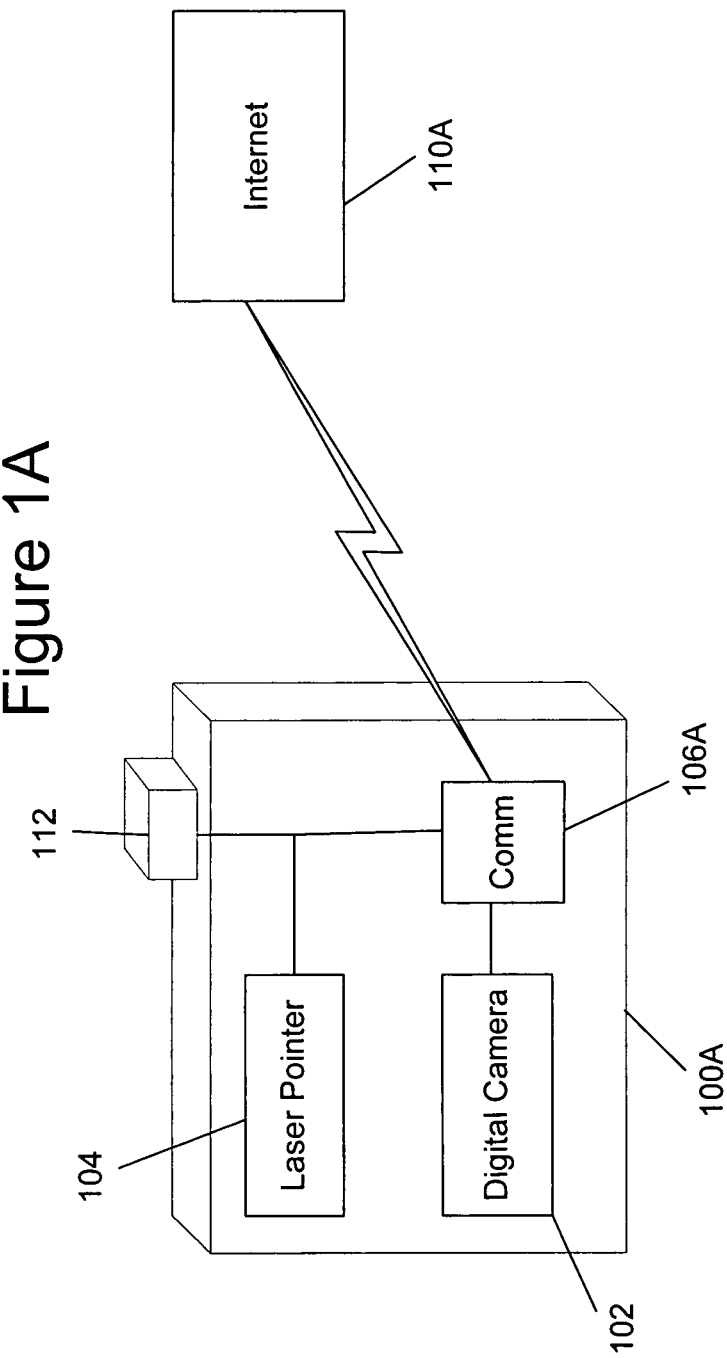

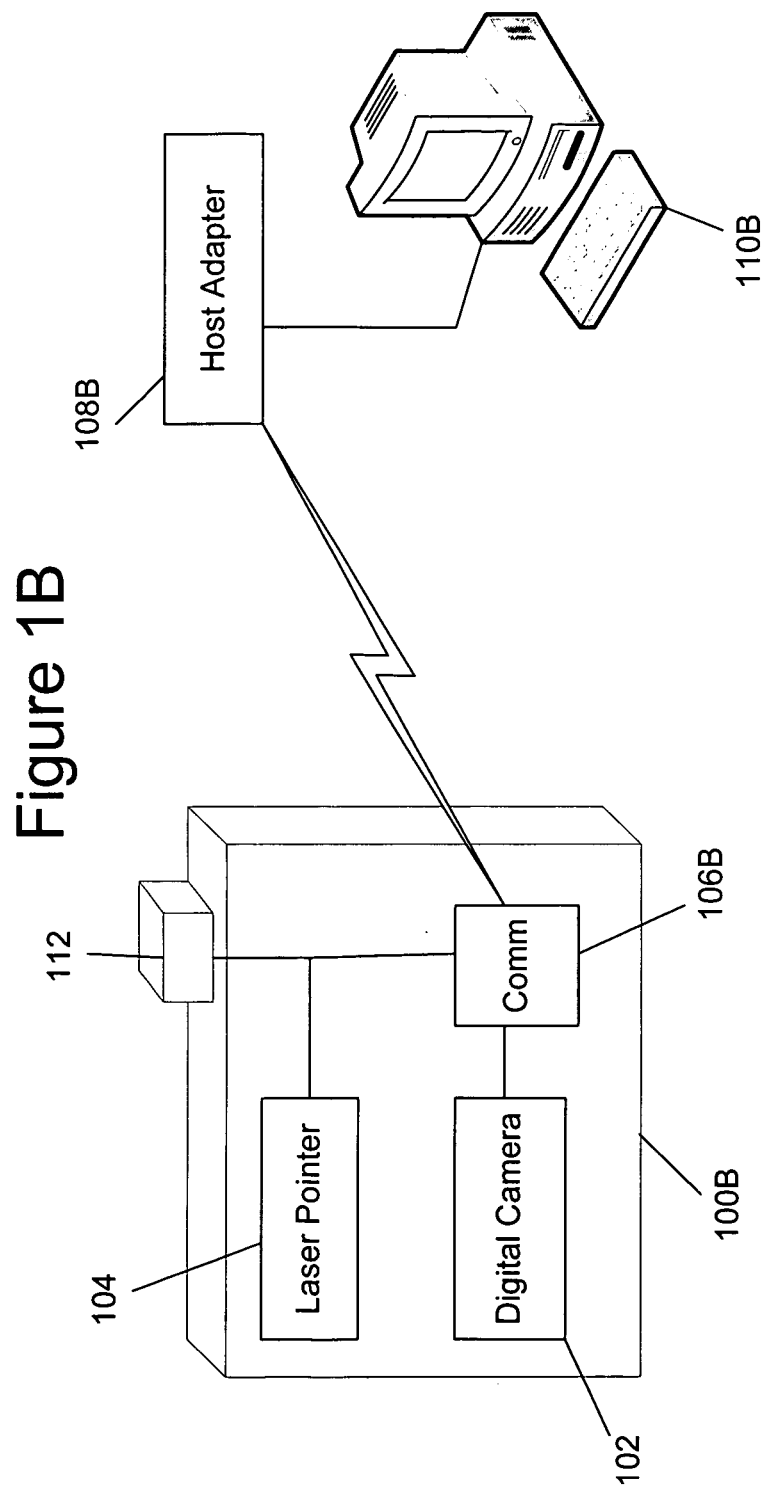

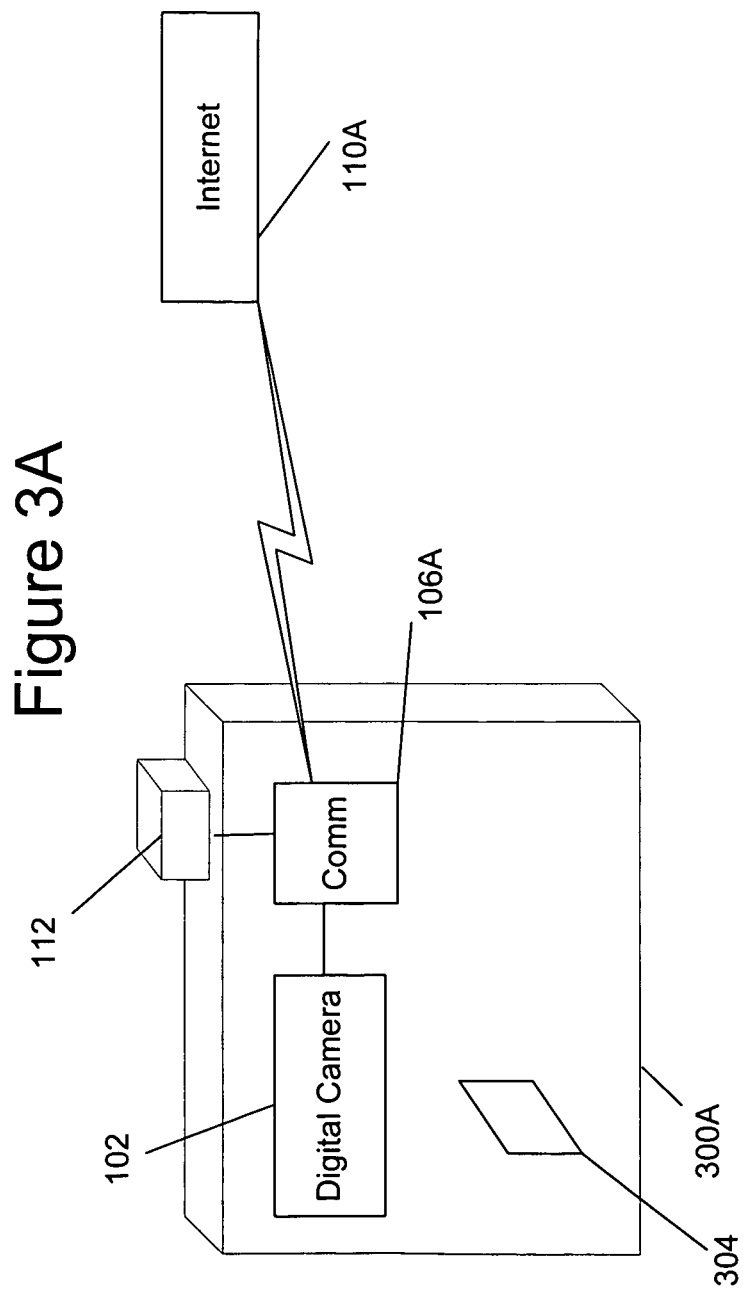

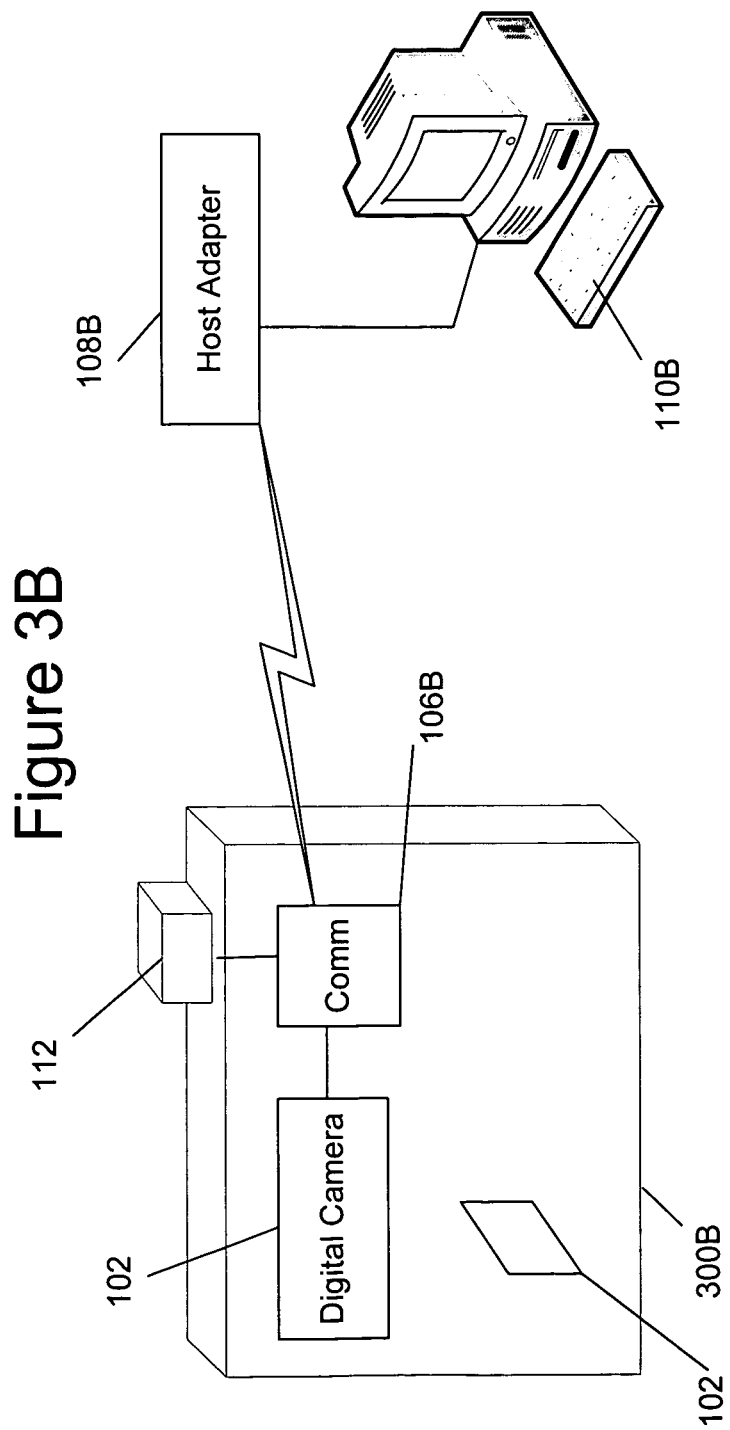

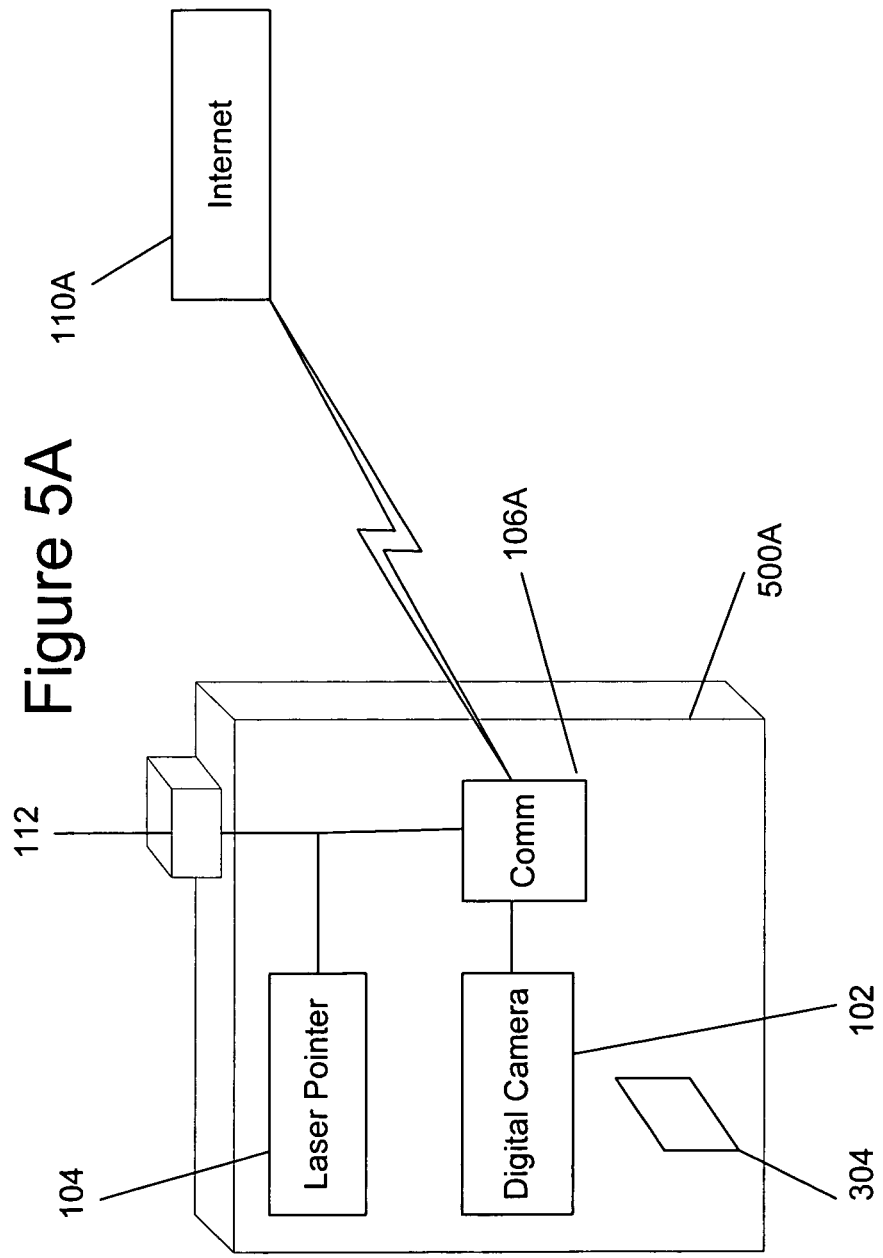

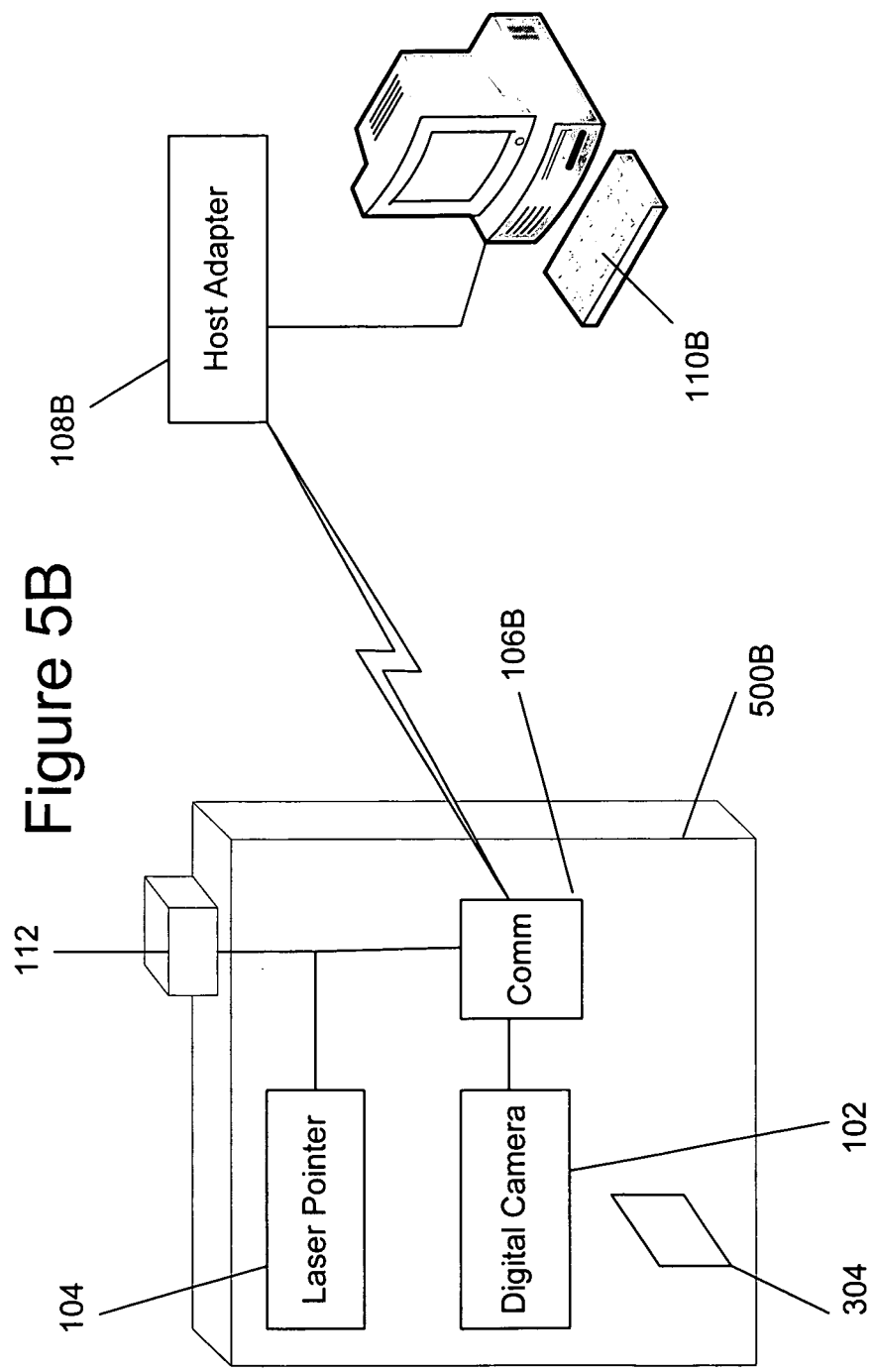

POINTING AND IDENTIFICATION DEVICE

FIELD OF THE INVENTION

The present invention is directed to a pointing device and more particularly to a pointing device which can allow a user to point to a spot and determine that spot's absolute location, either on a TV screen, a computer screen, or in the real world.

DESCRIPTION OF RELATED ART

In the computer industry, a well known peripheral is the mouse. The mouse allows the user to point to a specific location on the screen in two dimensions by physically moving the mouse along a mouse pad or other surface. The mouse detects its relative motion, either mechanically, by a ball and two perpendicular rollers, or optically. That relative motion is transmitted to the central processing unit, which runs a device driver for detecting the relative motion and imparting the same relative motion to a mouse pointer displayed on the screen. The motion detection is only relative because the mouse does not know its starting position; in fact, the mouse cannot detect that the user has picked it up off of the mouse pad and relocated it. Also, mice are limited to pointing on the screen and cannot let the user point to locations in the real world. A mouse cannot be used to directly point at a location on a computer screen. A mouse cannot be used at all to point to locations on a typical TV screen or locations in the real world. Moreover, mice typically cannot let the user point in three dimensions.

In a different field of endeavor, low-cost, low-power lasers have allowed a variety of pointing applications. Such applications include a presentation controller with cursor control and a laser pointer, laser tag for game playing, and military applications such as guns with laser dots and laser-guided bombs.

A more detailed example of an application for laser pointing is the OMEGASCOPE® handheld infrared thermometer OS530 E series, from Omega Engineering, Inc., of Stamford, Conn., U.S.A. That device creates a single dot or a circle of dots via laser to aim an infrared thermometer. An optional digital camera recorder can be mounted on it; there is also a distance measuring option. The circle formed by the laser is not used to determine distance. The camera is not used to process the data in real time because the camera is just a recorder.

Another more detailed example is the LaserMouse from Penta Performance of Albuquerque, N.M., U.S.A. The Laser-Mouse combines a wireless mouse with a laser pointer for slide presentations. However, the user moves the mouse pointer by actuating a navigation disk on the LaserMouse, similarly to the "eraser" mouse on laptop computers. The LaserMouse detects relative movement only, and its mouse function operates completely independently of its laser pointer function.

Nintendo has demonstrated a product called "Revolution" (http://www.gamesindustry.biz/content_page.php?aid=11573). This is a distance pointing device that provides its roll, distance from screen and angle with respect to screen to a video game. It does not use a camera and does not directly mark a screen like a laser.

In still another field of endeavor, NeoMedia has announced a product called PaperClick® for Camera Cell Phones™, which reads and decodes UPC/EAN or other bar codes to link users to the Internet, providing information and enabling e-commerce on a compatible camera cell phone, such as the Nokia® 3650 model. A similar product, called PaperClick® Mobile Go-Window™, provides a horizontal bar on the screen of a wireless device where users can enter numeric strings from UPC or other bar codes to link directly to targeted online information.

Four U.S. patents cover related technologies. The first patent (U.S. Pat. No. 6,430,554 B1) covers technology that uses uniquely-coded objects, such as consumer goods to automatically generate an online search for information related to those objects or goods from a computer, PDA, mobile phone or other device. The second patent (U.S. Pat. No. 6,651,053 B1) is an extension of the first, covering additional mechanisms for performing such searches using mobile devices. The third patent (U.S. Pat. No. 6,675,165 B1) covers uses of location-based technology to deliver content that is based both on a particular advertisement and the geographic location in which the advertisement is located. The fourth patent (U.S. Pat. No. 6,766,363 B1) covers techniques for providing information to end users based on objects, goods or other items depicted in external media, such as video, audio, film or printed matter.

The above and related technologies permit users to use the cameras in their mobile phones to take pictures of offline media, such as magazines, posters, product packaging, and logos. Visual matching technology identifies the pictures and connects them directly to relevant information.

In yet another field of endeavor, cameras have been combined with reticles for such purposes as gun scopes and periscopes.

However, there is still no solution in the art to provide a pointer for pointing directly at, clicking-on, and identifying a distant absolute location and for doing so on a TV screen, on a computer screen, or in the real world.

SUMMARY OF THE INVENTION

It is therefore an object of the invention to provide such a pointing device.

To achieve the above and other objects, the present invention is directed to a pointer configured as a camera mouse capable of two-way communication, e.g., wirelessly. It is easier and more natural for the user to point directly at an object and to see the pointed-to spot in context. The present invention also allows the user to see that context better (e.g., by using peripheral vision).

In one embodiment, the pointer incorporates a laser pointer. The laser pointer allows the user to aim the device; also, in contexts such as game playing, other users can see the dot produced by the laser pointer.

In another embodiment, the pointer includes a camera or other viewing device with a reticle. The reticle allows the user to aim the device. Advantages of the reticle embodiment include discretion and safety.

Another embodiment uses both the laser pointer and the reticle.

The various embodiments can be used in various settings, e.g., shows (including television shows, whether broadcast or on cable, videotape, or DVD; movies; and in some embodiments even radio programs or live theatrical performances), computer screens, very large displays (such as movie screens) and the real world. The absolute location of the spot in show space-time pointed to is determined as follows.

For shows, the user points the pointer at a display on the television and clicks to specify the pointed-to location in show space-time. Other clicks can be used for other context-sensitive options. First, the PID determines the frame ID. The frame ID is a unique pre-assigned number for each frame in each show. The frame ID of the pointed-to frame is determined in one of many ways. In the first way, software recognizes the frame from a centralized database of frames, then looks up this frame's frame ID. In the second way, the PID can directly read the frame ID off the screen or hear it in the show's soundtrack when present in the show. In the third way, the PID can deduce the frame ID by knowing the time that the frame was displayed and the show's provider and channel (i.e., its location in distribution space-time). Once the frame ID is determined, the PID's image of the frame is computationally compared to the archived image of the frame. The location of the PID's dot and/or reticle on the displayed frame provides a precise location on the archived image of that frame. Alternatively, the PID can find any Frame that contains the designated subarea. It is not always necessary to determine the exact frame ID originally pointed to, only the Frame ID of a Frame that contains that subarea. A prestored mapping of locations on the archived frame to objects then provides a list of objects potentially being pointed to by the PID. This list can contain information needed to highlight said objects and/or information needed to "click up" and "click down". Alternatively, the PID does not need to determine the exact frame pointed to, only a frame that contains the subset of the image that is pointed to. Then, the TV can highlight the designated object. Or, just as the PID's dot can serve as a cursor, the PID's dot and/or reticle can be altered to "highlight" or frame the designated object. Uses include recognizing what is shown on the screen and accessing and displaying a catalog of related items.

When the pointer is used as a computer mouse, the absolute location can be determined thus. The user points the pointer at the computer screen and clicks to specify the pointed-to location in display space-time. Other clicks can be used for other context-sensitive options. The location is communicated to the computer to move the on-screen mouse pointer to select a screen location. The display of that on-screen pointer may be unnecessary in PIDs with a laser pointer, as that pointer can serve as the on-screen mouse pointer.

A PID can point to a spot in the real world to determine the spot's location relative to the PID. In that case, the user points the pointer at an object in the world and clicks to specify the pointed-to location in real world space-time. As in the show-based implementation, the dot and/or reticle may be used to highlight or frame the designated object. Again, other clicks are available for other context-sensitive options. A location (point or area) relative to a PID or an absolute location (point or area) can be determined.

Given a lookup table of absolute locations and objects, the absolute location of the spot can be used to identify the object. Alternatively, given spot's location relative to the PID and the absolute location of the spot, the absolute location of the PID can be determined.

When the PID's pointer is used to point at a spot in the real world, the spot's absolute location can be determined thus. The user points the pointer at the spot and clicks to specify the pointed-to location in real-world space-time. Other clicks can be used for other context-sensitive options.

A PID can identify an object that is pointing at and clicked-on by many methods. The PID may use, for example, image processing software to recognize objects, the spot's absolute location and an absolute-location-to-object lookup table, or can read a tag that identifies the object. If the PID determines that the spot is on a TV screen, it can trigger or coordinate the determination of the frame ID and the frame location and other activities associated therewith. If the PID determines that the spot is on a computer screen, it determines precisely where and provides that information to that computer's drivers. If the PID determines that the spot is on another object, it can determine that object's location, orientation, and ID and trigger, manage, or perform the operations appropriate to that object in that context.

A PID that can determine the absolute locations of two reference points on its pointing axis and on (or in) the PID can determine its absolute location and the direction in space of its pointing axis. A PID that can determine the absolute locations of three non-collinear points on (or in) the PID can determine the absolute location and orientation of the PID and the absolute locations of all points on (or in) the PID.

Likewise, a PID that can determine the relative locations and the identities of three non-collinear points on an object can determine the relative location of the object and its orientation in space.

A PID, when fixed and able to scan or monitor a space, defines a useful digital coordinate system in that space and is referred to herein as a Reference Framework (RFW) and the space is referred to as a Digital Space (DS).

When a PID can determine its absolute location and orientation in space, that PID can determine the absolute location and orientation in space of any object whose relative location and orientation it can determine.

A simple laser pointer can designate spots for an RFW to locate and identify. This provides another means for a PID to determine the absolute location of a spot pointed to in the real world. The activities of an RFW may be supervised by the user via a display and input device in the RFW, a mobile PID, or separate computer.

There are two main steps in the PID process of selecting and identifying items to act upon them. First, the user selects an item; then the user acts upon that selection.

The selection process has three main steps. Via the first step, the user designates the item. The second is that the PID system provides the user feedback as to what the system ascertains that the user has designated. Thirdly, the user has the option to respond to the PID system's feedback.

BRIEF DESCRIPTION OF THE DRAWINGS

Preferred embodiments of the present invention will be set forth in detail with reference to the drawings, in which:

FIGS. 1A through 5B relate to PID embodiments that employ the Frame Compare Method to point to frame locations and identify objects in shows on a TV screen, in images on a computer screen, and in views in the real world.

FIGS. 1A and 1B are block diagrams showing a first preferred embodiment of the present invention;

FIG. 2 is a flow chart showing the use of the embodiment of FIGS. 1A and 1B;

FIGS. 3A and 3B are block diagrams showing a second preferred embodiment of the present invention;

FIG. 4 is a flow chart showing the use of the embodiment of FIGS. 3A and 3B;

FIGS. 5A and 5B are block diagrams showing a third preferred embodiment of the present invention, which combines the features of the first and second preferred embodiments;

DETAILED DESCRIPTION OF THE PREFERRED EMBODIMENTS

Figure 2:
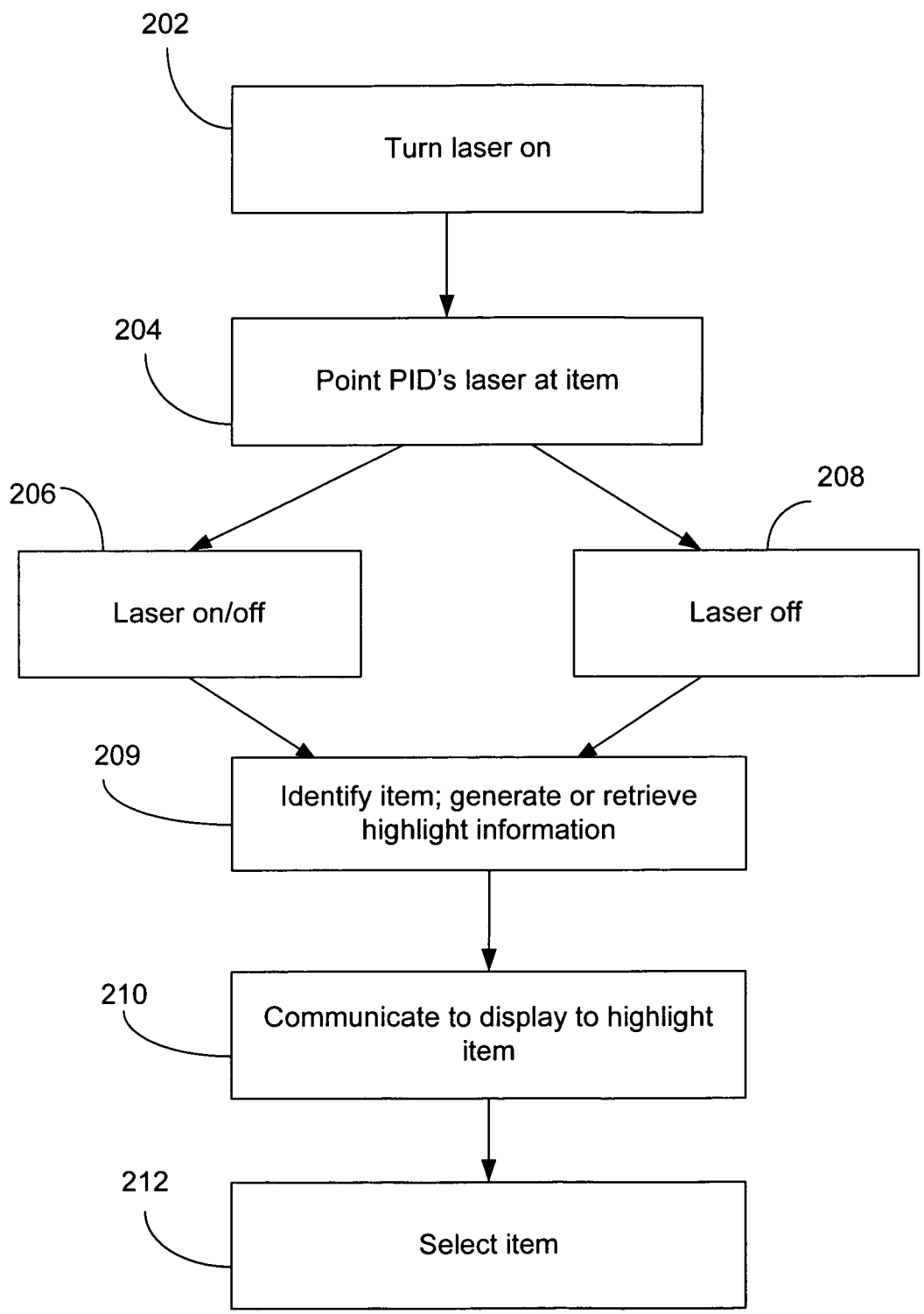

Preferred embodiments of the present invention will be set forth in detail with reference to the drawings, in which like reference numerals refer to like elements or operational steps throughout.

FIG. 1A is a schematic diagram showing a pointing and identification device (PID) 100A according to the first preferred embodiment of the present invention. The pointing device is a PID camera mouse for pointing to a Frame on a TV screen and a location on that Frame or to a view of the real world and a location in that view and includes a digital camera, which may be a digital video camera, 102 for taking real-time images, a laser pointer 104 for projecting a dot onto the object to be pointed to, and a wireless communication component 106A for communicating with a computer or Internet 110A running software for: 1a) recognizing a Frame captured by the PID and/or; 1b) determining the location pointed to on that Frame and/or; 2a) recognizing an object in a view of the real world and/or; 2b) determining the location pointed to on or near that Object. The pointing device 100 has at least one mouse button 112.

The wireless communication component 106A can implement any suitable wireless communication protocol, e.g., Bluetooth, WiFi, WiMax, or any suitable standard for digital cellular telephony. In the last case, the wireless communication component 106A can implement a complete cellular telephone, with speaker or microphone, or can offer reduced functionality, depending on the intended use.

FIG. 1B is a schematic diagram showing a pointing and identification device (PID) 100B according to a variation of the first preferred embodiment of the present invention. The pointing device is a PID camera mouse for pointing to a location on a Frame on a computer screen and includes a digital camera, which may be a digital video camera, 102 for taking real-time images, a laser pointer 104 for projecting a dot onto the object to be pointed to, and a wireless communication component 106B for communicating with a host adapter 108B on a computer 110B running a device driver for the pointing device. The pointing device 100B has at least one mouse button 112.

The wireless communication component 106A or 106B can implement any suitable wireless communication protocol, e.g., Bluetooth, WiFi, WiMax, or any suitable standard for digital cellular telephony. In the last case, the wireless communication component 106 can implement a complete cellular telephone, with speaker or microphone, or can offer reduced functionality, depending on the intended use.

Any laser-aimed PID, including a laser-aimed PID (with or without a camera) has many benefits. It is more natural to point at something and see where the dot image is. The user can see the context better. Others can see the laser dot. However, it has the following disadvantages relative to non-laser-aimed embodiments. The dot can obscure the view. The laser may be dangerous. The dot can disturb other viewers. The dot may require augmentation on a bright target. The use of the term "dot" herein may refer to any shape of the laser's beam, including, but not limited to: a dot, a crosshair, a polygon, or a grid.

The user uses the laser-aimed PID camera in the following manner, which will be explained with reference to the flow chart of FIG. 2.

In step 202, the laser is turned on. The safest way here is to probably require that the user hold the laser button down to keep it "on." When the user releases the button, s/he is done until s/he presses it again.

In step 204, the laser is pointed at the item. The PID may be keeping track of the location on the frame as the laser is moved across it; this is essential for some uses.

At that point, depending on the configuration of the device, the laser can be actuated in one of two ways. The first is called Laser on and off (LOOF) (step 206). Here the camera takes a picture of the frame with the laser on and a picture with it off. This is done very quickly, controlled by the PID, not the user. The user just holds the laser-on button "on." The image of the frame with the laser off is used to determine the Frame's identity, if that is necessary. Comparing the laser-off image to the laser-on image can also be used to determine the location of the laser dot relative to the Frame.

An alternative is laser on (LON) (step 208). Here the laser does not need to be turned off and on. It is generally left on. This can be used with some Frame identification algorithms and of course can be used when it is not necessary to determine the Frame ID. The reflected laser light has unique optical properties (speckle, brightness, single frequency), so it can be recognized by a smart enough system.

In step 209, the item is identified, and the highlight information for highlighting the item is generated or retrieved. In step 210, the PID communicates to the display to highlight the Item (optional). The system displaying the frame can use the information from the pointer to highlight an Item when the pointer is within its boundary, within a certain range of its boundary, the closest Item to the laser dot, or some other algorithm or mapping.

In step 212, the user clicks to select the item. In some embodiments, as will be described in detail below, the PID communicates with a remote system to obtain a list of likely pointed-to objects from which the user can select.

Following are a number of paragraphs relating to lasers in the context of the pointing function of a PID. Much of what is described here is applicable to other uses of lasers in PIDs.

To increase the visibility of the dot, especially on brightly lit or non-perpendicular specularly reflecting surfaces, various embodiments can be configured to have a frame or large cross-hair formed by the beam.

Because the PID includes a laser, various provisions can be made for laser safety. One such provision has been made above, where the user must hold the button on to keep it on. Another is eye recognition. By identifying people's eyes and then turning the laser off, the PID can prevent the beam from entering a person's eyes (or other animals or fragile sensors) or minimize the time of exposure to prevent damage. A single perceptron neural net can identify the silhouette of a person's head (including with various types of hairstyles and clothing), eyes, nose, forehead, or face. Red-eye detection can also be used. The phenomenon of "red-eye" is well known to anyone who has seen photos of people. Here, light reflected (eyeballs are natural reflectors) from the retinas of people (and many other animals) produces a simple pattern of two circles of light with a characteristic frequency distribution and small range of distances apart. A device using this technology can also be used to locate concealed individuals, e.g. by the Secret Service and/or the military to find snipers.

Ways of increasing dot visibility will now be considered. Some may be applied automatically when the PID senses that the dot's image is below a certain threshold. That threshold may be set by the user.

Frequency-specific filters can be used to increase dot visibility Because a laser's beam has a single frequency of light, the visibility of the beam can be increased by filtering out all other frequencies before viewing or sensing, thereby substantially increasing the signal-to-noise ratio. Such filtering may not be necessary when the dot is to be sensed by a sensor whose maximum sensitivity is tuned to the frequency of the laser's frequency.

A directional receiver can be used to increase dot visibility. For example, a long small diameter tube with a light-absorbing inner surface and/or light intensification hardware (e.g. starlight scope) especially if such can be tuned to the laser's frequency. Another benefit of this configuration is that it would not be fooled by multiple reflections of the dot—that sometimes return a brighter signal than the target.

The intensity can be increased to increase dot visibility on certain surfaces or under high-intensity lighting.

A dot that flashes will be more visible than one that does not.

A reticle (to be described below with reference to the third embodiment) (and processing associated therewith) can improve the visibility of the dot.

It is useful in some applications to provide selective laser dot visibility, i.e., to make the dot invisible to some, but visible to others. Ways of providing selective dot visibility will now be considered.

One way to provide selective dot visibility is to use a frequency of laser that is invisible to the human eye (e.g., IR or UV) in combination with an element to make the reflected image visible to selected others. If the beam is IR, an IR scope can be used. If the beam is UV, a scope with a solution of a fluorescent material will show the reflected UV.

Another method for selective dot visibility is to use a very dim laser. This can be combined with an element for increasing beam visibility.

Another method for selective dot visibility is the use of a reticle instead of a dot, as in the second preferred embodiment, to be described below. No laser dot is visible to anyone if there is no laser, e.g., if the user sights the spot in a direction-defining reticle.

Varying the maximum laser intensity will help to provide a constant apparent dot size and/or brightness to the user. The intensity can be reduced to reduce dot size or reflected intensity on certain materials. That is different from laser modulation, to be described below.

The laser beam can be modulated to communicate information. One purpose for doing so is to discriminate multiple dots. A PID can sense the modulation to discriminate its dot from others (using a video camera or another sensor). This modulation may be very fast so that only PID's can determine which dot belongs to which PID. Alternatively, the modulation may be at a rate or pattern easily discernible by the users so they also can tell which dot is whose. This can be used as an interface for multiplayer computer games and/or use on very large displays. For example, hundreds of users can point their PIDs at a game projected onto a large movie screen, using the communication between PIDs to form alliances during the game. A game can be designed requiring only the PID dots and the communication between the PIDs, without a different computer projecting anything. A third-party wide-angle, multidot sensor (such as a video camera) can also use the PID's ID modulation pattern to award points, etc., in a game. Another application of third party dot ID reading is to identify a PID that is being used for an illegal purpose, such as attempting to affect a pilot's eyesight. Beam cross-section shape and beam color may also be used for user determination.

Modulation of the laser beam can be used to communicate between PIDs and/or with other types of systems. High-speed modulation will require a laser sensor separate from the PID's camera, as such cameras will be too slow for many high-speed applications. PIDs can communicate with each other by pointing at one another or at any surface that reflects the beam enough to pick up the modulation. This can include a computer screen, a projection screen, or just the side of a wall. If the beam spot locations are fixed, a very large number of dots could be displayed in a 2D array. Imagine a generous 1 cm square allocated for each beam. A square meter can hold 10,000 such dots. Over each dot can be a picture of the person or logo of a company. If the laser sensors can be moved relative to the beams, any number of sensors could receive communications from any of the fixed beams.

Likewise, if the sensors are fixed and the beams are moving, any sensor can receive information from any number of beams. This may be confusing if information comes in from two at the same time, but not so bad if it is like a conference call where everyone can hear the single conversation. Just as individuals can know when to talk and when not to, software could moderate such a discussion. If each sensor/beam combination moves together, two-way communication would be practical between many sets of PIDs.

Wide-angle light sources can be used to broadcast information to a PID. Wide-angle sensors can be used to scan for signals.

The modulation of a laser to communicate information is not by itself new. To combine this capacity with the circuitry, microphone, and speaker already in a cell phone to communicate audio and/or visual information and the circuitry, camera, and display in a cell phone are new and useful technologies. It will be relatively easy to make cell phones that also function as laser walkie talkies, without the use of the cell network. Likewise, images from one cell phone can be directly transferred to another.

An advertisement or landmark, for example, can use a local laser "radio" (sound) and/or "TV" (sound and images) for one-way or two-way communication with a PID. By using visible light, UV, and/or IR (which are not regulated by the FCC), the laser "radio" and/or "TV" can have a greater range than the 2.4 GHz communications allowed by the FCC. A PID can send out a wide-angle signal to see who will respond. Some transmitters may be powered by the laser from the PID.

Likewise, an optical transceiver can provide wireless Internet access. When a PID user gets in the range of a local laser channel, the cell phone beeps and an icon for that channel joins the array of other icons on the PID's screen. The user can delete the icon, cutting off the channel. The user can click on the channel to view and/or listen to the channel. The channel's icon automatically disappears when the channel gets out of range. When there are too many channels to fit on a screen, they can be automatically classified into folders.

It may be best to use a radio or other signal that bounces around to let the PID know that the channel is present and where to point the PID to get it. The channel's content is transmitted by a visible light signal, accessed by pointing at it. This allows many channels to use the same frequency.

The laser can also be used as rangefinder, like the IR rangefinders in video cameras that measure the time of an IR pulse to determine its distance.

The beam's focus can be varied to vary the dot size at various ranges. The beam can be made divergent to illuminate a wider angle when searching for retroreflective barcodes and/or light sensors. One can enter into a PID the name(s) of an Item or the class(es) of Item that one wants to find. The PID beam diverges to cover a wide angle while looking for light-sensitive objects capable of identifying themselves or being identified. The PID informs the user when it has found that for which the user is searching. The focus can also be controlled to reduce the beam's energy density, e.g., to reduce the possibility of it injuring a person's eyes.

A second preferred embodiment uses a camera with a reticle to implement a reticle-aimed camera mouse with links in/out (e.g. cell phone). The second preferred embodiment has the advantages of discretion and safety. As shown in FIGS. 3A and 3B, the PID 300A or 300B includes a reticle 304 instead of the laser; otherwise, the PID 300A or 300B is configured like the PID 100A or 100B of FIGS. 1A and 1B, respectively.

Figure 4:
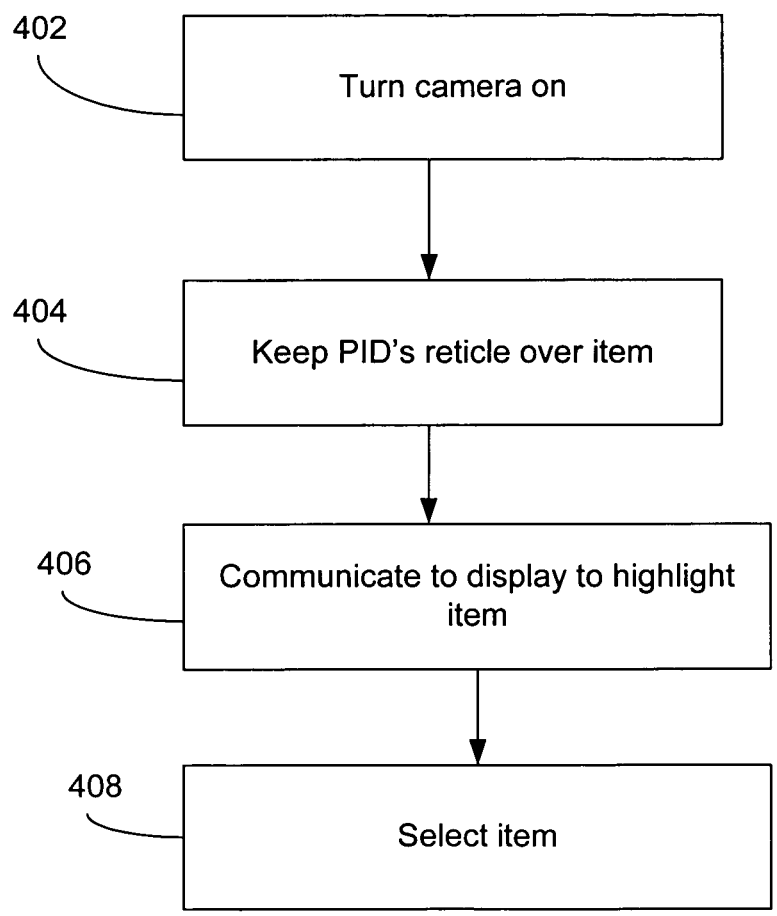

The use of the PID 300A or 300B will be explained with reference to the flow chart of FIG. 4. In step 402, the user turns the PID's camera on. In step 404, the user keeps the PID's camera's reticle over the item. Herein, "reticle" refers to any means that the user sees in a viewfinder to designate a spot in the view or a subarea of the view. The PID may be keeping track of the location on the frame as the reticle is moved across it. In step 406, the PID communicates to the display to highlight the item (optional). Alternatively, the PID may alter its reticle to frame the item. In step 408, the user clicks to select the item.

The reticle 304 may be fixed or mobile with respect to the camera image. A fixed reticle (FiRe) is useful when the intention is to move about the pointing of the camera. It is typically in the center of the view. A mobile reticle (MoRe) is most useful when it is most convenient to keep the camera fixed. The reticle may be switchably fixed or mobile. The PID 300 can include rotatable polarizing filters to remove glare.

A third preferred embodiment, having variants shown in FIGS. 5A and 5B as 500A and 500B, respectively, combines the laser and reticle. As there are complementary benefits to both the laser and the reticle versions, the third preferred embodiment gives the option to use the laser and reticle either separately or together. Additionally, the third preferred embodiment has the camera and laser on the same unit and the laser and the camera in alignment with the center of the camera's reticle (coaxial) coincident with the laser dot.

Variations on the preferred embodiments and methods of use will now be disclosed.

There are a number of ways to cause the laser dot and the reticle to be coincident.

The first way to cause the laser dot and reticle to be coincident is to place the laser close to the lens of the video camera, making the laser's image very close to the center of the field of view of the laser. The small resulting errors can be corrected, when necessary, by using a rangefinder to determine the distance to the dot, then based on the distance, deflecting the beam the tiny amount needed to make them coincident. Conversely, the camera can sense the displacement of the laser dot and control the deflection of the beam to correct it (and in the process, provide range information).

The second way to cause the laser dot and reticle to be coincident is to use a "steady shot" mode, such as is used in some video cameras, with a part-time laser deflector. That mode uses a shutter speed of 0.01 s. Such cameras typically do this 30 times per second. This leaves 70% of the time with the shutter closed. During that shutter-closed time, the laser beam can be introduced by using a rotating optical element. The element deflects the laser into the path during shutter-closed time and does not deflect the video camera's input during the shutter-open time. This variant does not allow the camera to view the laser dot.

The third way to cause the laser dot and reticle to be coincident is to use a full-time laser deflector. This can be especially precise if the camera (or other sensor) is installed in a configuration roughly analogous to an SLR camera. Here, a perpendicular to the effective center of the plane of the camera's sensor is collinear with the beam of the laser. Here, an optical element intercepts at least a portion of the video camera's light input path. The laser is mounted at an angle to the axis of the path. The optical element deflects the laser beam into the center of the path, collinear with the path's axis. The element may be small and fixed, possibly creating a small blind spot in the middle of the camera's image. That doesn't matter much as all to be seen there is the center of the laser's dot (assuming the dot is not otherwise deflected).

The fourth way to cause the laser dot and reticle to be coincident achieves exact centering by using a tiny prism to reflect the laser's beam from being perpendicular to the camera's axis to being coincident with the axis and in the center of the camera's field of view. The prism can use total internal reflection (TIR) or a coating to reflect the beam. If the prism's index of refraction matches that of the optical medium in which it resides, it can be extended in length (for example) to allow for fine tuning or removal. To keep the image of the dot small, the reflector should be outside of the focusing optics for the camera's sensor. It can be moved slightly into the camera's focusing optics to permit focusing of the dot.

The fifth way to cause the laser dot and reticle to be coincident is uses an HOE (holographic optical element) prism or reflector tuned to the laser's frequency and angle of incidence so as to be nearly invisible to the light going to the video camera. If made large enough, the HOE could also capture the reflected beam or the beams of other lasers of the same frequency or selected frequencies. Alternatively, the return path can be handled by another optical path. Signals from the return path may be merged with the video signal to superimpose the laser information over the video information.

The sixth way to cause the laser dot and reticle to be coincident with exact centering can be achieved by having two video cameras with overlapping fields of view and the laser emerging from between the cameras. If each of the cameras feeds a separate display, stereoscopic perception of the view can be achieved.

The laser can point the camera without looking at a screen, making the laser a viewfinder for the camera (as in a known video camera—DigiPen-480 by Opcom).

FIGS. 1A, 2, 3A, 4, and 5A depict PID embodiments that employ the Frame Compare Method to specify the absolute location of a distant point in the real world. The Frame Compare Method will now be described. There are applications where certain steps may be omitted. For example, there are applications where the object does not need to be highlighted or outlined. These steps may be performed on a saved single image or a series of image from real-time video.

1. First, the item is designated. When the User sees an Item of interest, s/he activates the PID's designator (laser or camera's reticle) and points it at the Item on the TV or other space. Pointing the laser (or camera's reticle) at the Item automatically points the camera at the area of interest. As soon as the laser goes on, the PID begins to optically track the location of the laser dot on the Frame using the PID's camera (which is aimed automatically via the laser.) The PID may provide Item feedback as the User scans the scene or only after the User selects a Frame.

2. Then, the frame image is recorded. If the designator includes a pointer visible on the Frame image, the frame is recorded using POOF (pointer on, pointer off) or PON (pointer on) (the laser variants are LOOF and LON). The frame image may be just the soundtrack, the visual image, or both e.g. in a Show. The User may refine the Item designation on the Frame Image on a screen.

3. Then, an attempt is made to determine the context-type (e.g. computer screen, game box screen, TV screen, or view of the real world). The PID or RFW looks for LOIDs in the designated area. (As described in greater detail below, a LOID is any tag affixed to an object that may or may not be used to determine the object's ID, but necessarily can be used to determine the object's location and/or orientation.) If there are LOIDs, the PID or RFW reads the LOID and then retrieves the Items' Feedback information. The Feedback information is transmitted to the device where the User is monitoring his feedback upon.

If Frame ID's have a unique format or ID (i.e. they cannot be confused with anything else), then the PID or RFW looks for Frame IDs in the Frame or in other signals associated with the transmission. If a Frame ID is found, then read the Frame ID from the screen (the Frame Id may be on the displayed Show Image, in a closed caption, in a Text subchannel, or in a subtitle) or embedded in the soundtrack; then Determine the Context from the Frame ID; then go to where the location of the pointed to spot is determined.

For audio, the Context-type, Context, and Frame ID may be determined via audio fingerprinting. Such technologies exist now that can recognize a song after 3-4 seconds. Identifying a frame is harder because there is less time per frame, but easier because it is in a bigger context. If the designator is operating in an audio fingerprint mode, the audio "frame" is sent to the computer that has the database suitable for the "frame" compare. This computer determines the Frame ID and may send back a list of Items as User feedback or return video feedback. It will be useful for the designator to have a short audio buffer to store recent audio for audio ID functions.

If the designator is a PID, there are options for determining the context-type. The Context-type may be entered by the user or provided by an external source. The PID may be able to determine the Context-type via an ID tag on the displaying device (e.g. on TV, computer monitor, etc), or by recognizing the TV's screen outline or other elements of the TV, computer monitor, etc. The Context-type need not be determined until the frame is transmitted to the computer for analysis, or it may not even be needed. For example, a Frame Compare on the image may conclude that the frame is from the movie Shrek. It is not very important whether the frame is being displayed on broadcast television, cable, or satellite television or is being played from a videotape or a DVD.

If the designator is an RFW, the location of the pointed-to spot can be used to look up the Context-type. For example, the RFW may be a Frame Array or a dedicated camera, either of which may detect the location of the spot pointed to by a laser signal.

4. The Frame, context-type, and other data are transmitted to a computer for analysis. If the context-type was not determined above, then the data are transmitted to a remote System to determine the context-type. Once the context-type is now known, the data are transmitted to the relevant device. Depending upon the context-type, the image(s) (and/or soundtrack) are transmitted for context-specific "image" analysis. If the context-type is a computer, game box, TV screen, or real world, two situations apply:

Efferent—If this is a control (e.g. mouse) application, the data will typically be sent to the controlled device's PID/controller drivers. In another control application, the User can use the pointer to designate where to move the target device.

Afferent—If this is an item-ID application, the data may be sent to that device or to a remote System for further analysis depending on where the database of "images" to compare to the captured "frame" is available.

5. Once the Context type is obtained, the Context is determined: which Frame, View of 3D model, etc. In applications where moving video is presented, (e.g. TV, DVD, computer display) successive frames are often quite similar to one another. The System's goal is to determine the Item pointed to, not necessarily the exact frame. If the System finds any frame with a match to the pointed-to subarea, that is all that is necessary. Thus, the designating device need only capture a portion of the displayed frame. Likewise, there is no need to transmit the entire image. On the contrary, because we point to a specific subset of said image, if necessary, we can send a very detailed image of just the pointed to subarea. We may also want to send some data from some other regions of the image to be sure that we have the right general context, e.g. the right episode of the Show.

If the application provides Frame IDs and if Frame IDs do not have a unique format, the designating device will generally read the Frame ID (the context). Alternatively, this may be done at the computer. If the Context-type is computer or game box, send the "frame" to that device. There, software compares the frame data to data on recently displayed frames, if the Frame ID is not already known. If the Context-type is Show or real world, send the frame data to a computer with the appropriate database for Show and/or real world applications (FIGS. 1,3,5B). When the PID is capable, use the PID's computer. An early example is PID reading tags.

The Context-determination process operates as follows. If the application provides Frame IDs and if Frame IDs do not have a unique format, read the Frame ID and go to where the location of the pointed to spot is determined.

In some applications, it will be cost-effective to deduce the Frame ID of the frame captured by the designating device from its location in Source space-time. For example, if the Context-type is Show, the exact time it was displayed and the carrier x channel it was displayed on can be mapped on a central computer to a Frame ID. If the Context-type is local computer, DVD, TV, etc., and if the local device knows what was displayed exactly when, said local device can map the exact time of display to the Frame ID or other Context. This may require precise synchronization that may be supplied, for example, by S2C (detailed elsewhere herein). If the Context-type is Real World and if the designating device can determine the designated Item's exact location and there is a database of locations to Items, said database can be used to ID the Item. The orientation of the designating device relative to said Item may need to be known to optimally determine the exact Item. The more "fixed" the Item is, the less precisely the time needs to be known.

If the Context-type is Show, the Context is the Frame ID. Examples include TV Shows, DVDs and video tapes. For a movie in theater, the User will want to use a reticle PID variant, so as not to disturb others in the theater.

If the Context-type is Theatrical Production, there are no inherent separate Frames. The context may be any of the following: an ID that may be displayed on a screen or transmitted to PIDs; the location in the soundtrack; the Show ID×elapsed time. If the Theatrical Production is performed in a Digital Space, communication can be made directly to the RFW's controller to access Context or directly Item Feedback information.

If the Context-type is Print Space, the process looks for Text. OCR is a mature technology to determine content. Given the content, the System can compare the form, absolute location (if known), etc to determine if it is a book, magazine, or newspaper, etc. The System can compare the text to determine the specific type (book, magazine, newspaper), which one (e.g. which book), which page, etc. This technique may be able to determine which edition from font and page number/text alignment. If it is an ad, the System will determine whether it is a classified ad, a billboard, etc. The System also looks for web addresses and pictures, such as of a view, item, etc.

If there are tags, the context can be determined from the tags. Examples of tags are:
Ad ID—an ID that identifies the particular ID
Barcode, 2D barcode
Logo, including a barcode embedded in a Logo
LOID
Tags for location
License plate If the Context-type is the Real World (or an image thereof, e.g. in a movie and/or on a TV), the context is "Which View of the 3D model" (of real or other world). Software compares the frame to a digitized 3D model of the vicinity (may need also to determine the vicinity) to identify the View, looking for Landmarks and text for location context e.g. street signs, names of buildings.

If the Context-type is "Mouse", the Context is "Which Frame recently displayed by computer." Software on the computer being driven by the mouse compares the frame from the designating device (PID or RFW) to the most recent frames (it must have stored these) (comparing the most recent first) displayed on said computer to determine which of those computer-displayed frames is the frame represented by the frame from the designating device. Note that the Frame from the designating device may be a subset, superset, or overlapping set to the computer-displayed Frame. Note also that the System does not need to determine the exact frame, only a frame where a subset thereof matches the designated subarea.

The PID Mouse's controller on the computer may transmit to the PID the Frame IDs as they are displayed or the PID may transmit to the controller on the computer the status of the PID Mouse.

For any other context-type, send to appropriate computer to determine the appropriate context.

For those applications where the frame compare is done in the remote System's computer, the process will be vastly simplified when the "owner" of the frame has registered it with the remote System. The remote System will typically need that data to compare the image from the PID or RFW. It will be useful to Users if such "registered" frames or products that contain "registered" frames have a unique service mark indicating the registration status.

The location of the spot designated by the pointer (dot, reticle, LAR, drawn polygon, etc) is determined in that Context. Application of the laws of perspective may need to be used to compensate for the orientation and distance of the designator from the viewed space (screen, objects in the world including printed matter). The laws of perspective may be applied multiple times to compensate for, for example, a view of a photo of a photo. The perspective analysis can also be used to determine the location and orientation of the viewed space relative to the designator and likewise the location and orientation of the designator relative to the viewed space. Given the absolute location and orientation of the viewed space or the designator, the absolute location and orientation of the other can determined.

If a tag is designated, and if all is wanted is the Item's identity, then if the tag is instantiation-specific or, if the tag is only product-specific and that is all the user wants, then there is no need to determine the location or orientation of the tagged object. Otherwise, the following operations are performed. If the tag is a LOID, then read the LOID to determine the location (and orientation, if wanted). This results in an absolute location, to be processed as specified herein for such. In some applications, interpreting the LOID's image will be done by the PID, in others, by the computer. If the tag is not a LOID, then employ one of the other techniques in this step to determine the location and/or orientation.

Next, the local screen coordinates of the designated location are determined. If given the absolute location and orientation with respect to the PID or screen and relative location and orientation of the other (screen or PID), then compute the absolute location of the pointer, to be processed as specified herein for such. If the absolute location of the pointer on the screen or in the space is known via any of the following: given by the User or some external source, a Sensor Array Method, a LOID, or the absolute location and orientation of (PID or screen) and the relative location and orientation of the other, then, map the absolute location of pointer into the local screen coordinates.

Determine the designated location in the reference image's coordinates. If this is a frame compare and the context-type is computer, game box, or Show, then software compares the location of the PID's pointer (dot and/or reticle and/drawn frame) on the PID's image of the frame to the computer's image of the frame, to determine the location of the PID's pointer in the computer's image of the frame. If a frame-compare and context-type is real-world, then software compares the location of the PID's pointer (dot and/or reticle and/or drawn frame) on the PID's image of the view to the computer's model, to determine the location of the PID's pointer in the computer's model. Alternatively, this information may be given by the user or an external source.

Determine the identity of the object or objects most likely being designated from the location of the designator in the context. If there is a LOID or other tag, then if the tag is instantiation-specific or, if the tag is only product-specific and that is all the user wants, then, read the Identity from the tag, and skip to the next step. Otherwise, use the ID information and location and/or orientation from above to look-up the instantiation-specific ID.

In a Frame Compare application, use the Context and Location of the designator in that Context to make a list of objects in the proximity of the pointed to spot. If the context-type is Show, then use the Frame ID and Frame Location with the Frame Map to look-up and compute the objects. If the Context-type is Space, then use the 3D model to make the list of objects. If the designator is a pointer, then the default is to generate a list of likely objects, marking the most likely and perhaps also the others. If the designator is a subarea, the default is to generate one object. Alternatively, the product-specific or instantiation-specific ID may be entered by the user or provided by an external source The feedback data are determined for the list of most likely designated object(s). Software at the computer utilizing a lookup table maps the designated location to items in the space. Once the System has determined the Context-type, Context, and Location in said Context, it still may be difficult for the System to be certain which Item the User wants. For example, if the User has pointed to the shirt of an Actor, the System will not know with certainty that the User is interested in the shirt or the Actor or the cuff links attached to the shirt. There are many ways listed elsewhere to refine the Item designation. One includes, the System downloading a menu and an image of the Frame with a subarea containing the likely hits highlighted as detailed below.

The following is the Logical structure of the Menu; the User will see one with fewer levels of abstraction.
Wrong Frame (This is not a Frame with the desired Item.)
If rewind is available then the User selects this option and rewinds or goes forward to a Frame with the desired Item. When rewind is not available, the menu includes the choice for the User to view an Item trail. If the Item was not displayed on the last Frame, then the Item trail allows the User to review all of the Items that s/he pointed to (or even close) by all of the Frame Locations in Frames prior to clicking.

Right Frame
  Highlighting
    Not a Visible Item—The Item may be a service or something referenced by the Show that is not visible on any of the Frames. In this case, the User can select this option to get a menu that helps the User get Additional information on such Items.
    Visible Item—the Item is visible in this Frame Not in a highlighted subarea
      If the desired Item is none of the highlighted Items, the User clicks a subarea of the desired Item. Control then flows to "Visible Item" until the desired Item is highlighted. There should be a counter here to deal with a User in a loop.
    In a Highlighted subarea
      Multiple Not Overlapping
        If the Frame Location selected by the User is in an area between Items, multiple non-overlapping Items may be likely hits. Here all of the likely hits will be displayed as highlighted. The User then points to and clicks on the one desired. If the User has clicked on a subarea of one of the highlighted areas, transfer control to "Single Highlighted", else transfer to "Not in a highlighted subarea".
      Single Highlighted
        Now there is only one non-overlapping Item, therefore all possible choices are within the highlighted area. The User has the option here to scale up the display of the highlighted area to make the selection of a subarea easier.
      The Highlighted Area
        Signified by a special symbol in a subarea not containing any other Items. If the User selects this option, we know that the Item highlighted is the desired Item.
      Subarea of highlighted area
        If the User clicks a subarea on the image of the Highlighted Item, selecting a subset of the Item (e.g. cuff links), that subarea becomes highlighted and control is transferred to "Highlighted".
    Display a List of Likely Items If the Context-type is Show, (any Frame-based 2D model), the Frame ID×Frame Location maps to Item(s). If the Context type is Real World, (any 3D model), the location in 3D Space maps to Item(s).

If the designator is a spot, find all the Item(s) within a pre-defined range of a pointed to spot by proximity and, optionally, by frequency of choice, i.e. the more frequently the Item has been selected by this or other users, the greater the distance from the spot it can be to be selected. The degree of this depends upon our System's experience with this User. If this User is very precise in pointing, we will reduce this effect. If the User is not very precise (often wants the higher ranged Item), we will increase this effect accordingly. If the designator is a drawn polygon, find the Item(s) that best fill the drawn frame, typically only one.

It will be useful in some applications to highlight all of the Items found in the Frame or all that are available for a certain action option, e.g. all that are for sale.

Feedback may comprise data to do one or all of the following: move a cursor to the designated location on the screen; draw a frame, outline, highlight or otherwise specify the most likely designated object(s); provide a list of those objects for the user. The results are transmitted to the appropriate device(s) to provide feedback to the user. In the case of a computer or game box, this "transmission" may just be a standard mouse command to the appropriate application. The feedback may be displayed on the screen on which the image originated, and/or on the PID's or RFW's display. The PID may use its laser and/or reticle to outline or frame that object directly on the TV screen, the computer screen, or in the real world.

6. If the software-specified object is the one that the user wants to select, the user presses a mouse-style button or otherwise communicates said user's decision. If not, go to Step 7. If the feedback is a list of most-likely pointed-to objects, the user may navigate that list to select on or more of those objects or "none". If the user selects "none", go to Step 7.

7. The user may employ search refinement options to specify interest in a different object.

8. Repeat steps 5-7 until the user clicks-on the item of choice or decides to do something else. Another option is to save the state of this process to resume later, where this is feasible.

Embodiments that employ other methods for the PID to specify the "absolute" location of a distant point in the real world and/or to specify the location and/or direction in space of the PID's axis will now be described.

Any PID that knows the absolute location of its target can, given a lookup table of locations and objects, determine the object pointed to and the location pointed to on that object. Knowing the object, the PID can trigger or manage object-specific actions. For example, if the PID determines that the spot pointed to and clicked-on is on a TV screen, it knows to activate show-related Frame ID, Frame location, etc. operations. If the PID determines that the clicked-on spot is on a computer screen, it knows to behave as a mouse to the computer associated with that screen. Other such context-specific operations can be defined for other objects and/or locations on those objects and/or specific to the location (and/or orientation) of the PID.

A PID that precisely knows its absolute location and the location of its target relative to that PID can determine the absolute location of that target.

A PID that precisely knows the direction in space of its pointer (e.g. laser, reticle, or both), and the range of its target can determine the relative location of that target.

One way for a PID to determine its location in space and the direction of its axis is to use the Global Positioning System (GPS). GPS uses an Earth Centered, Earth Fixed (ECEF) coordinate system. Once two points are located, a line segment in space can be defined. The locations of two reference points on the PID, typically, its front and back ends, define the location and direction of a unique line segment in space. This line segment is herein referred to as the PID's axis. A boom can extend either the "front" or "back" of the PID to make the distance between them greater to make measurement more accurate. To make the unit less expensive and make the GPS measurements more accurate, the antenna in the front and the antenna in the back can be serviced by the same GPS receiver and processor.

Small errors in the reference point measurements will be amplified by greater ranges. GPS has a maximum resolution of about 1 centimeter.

There are three main sources of error in PID's determination of the location of a distant point. The first is the error in the absolute location of the PID. An error here propagates as simple unamplified translation error in the location of the target. This source of error in GPS implementations can be limited to within 1 cm.

The second source of error is in the range from the PID to the target. The range (by itself) also propagates an unamplified translation error. Rangefinding, depending on the method used, can be very accurate and precise.

The third source of error is in the direction in space of the PID's axis (assuming the axis is parallel or coincident with the pointing laser and/or reticle-defined direction). This source of error typically dominates the others as the error it introduces in the reported location of the target is directly proportional to the range of the target. A small error in the direction of a PID's axis can result in large errors in the reported location of the target at a great range.

When the direction of a PID's axis is calculated from the locations of "front" and "back" reference points, a GPS error of about 1 cm would be quite serious, if those locations were determined independently. However, those locations are not independent. They are, in fact, strongly interdependent.

Most GPS error comes from the path that the signals take. By removing some of this path-induced error, "differential GPS" improves GPS accuracy. In the PID, the signals reaching the "front" and "back" reference points take the same path. Thus, while the absolute locations of the "front" and "back" reference points may not be known to much less than 1 centimeter, the absolute locations of the "front" and "back" reference points, relative to one another, will be much more accurate, especially considering that the distance separating these reference points will be very precisely known. Thus, while the PID may not know where it is to much less than 1 cm, it will know the absolute locations of the reference points with respect to each other much more accurately, and thus it will be able to precisely determine the absolute direction in space of the PID's axis to a high accuracy. The PID's direction error will be virtually unaffected by Additional Secondary Factor Errors, Ambiguity, Receiver Errors, Clock Bias, Cycle Slip, Ionospheric refraction, Multipath errors, Temporal Decorrelation, Tropospheric Delay, etc. (for definitions of these terms, see: www.gpsworld.com/gpsworld/static/staticHTML.jsp?id=8000 thru 8006)

For many GPS-based PID applications, it will make sense to use "inverted DGPS". Here the differential calculations are done at a central site, most likely the "fixed" DGPS reference station.

A GPS-based PID can utilize signals from pseudolite-based systems. These produce GPS signals and "can be used near airports for precision instrument landings." (www.gpsworld.com/gpsworld/static/staticHTML.isp?id=8006)

Sensors in the PID can be used in conjunction with GPS to measure or to help refine the computation of the direction the PID's axis. For example, inclinometers built into a PID can accurately and precisely measure the PID's angle of elevation and roll. A beacon in a known location or sighting an object in a known location can determine the PID's horizontal direction (yaw). Likewise, yaw (as well as pitch and roll) can be determined by any of a number of gyroscope technologies such as, a variety of fiber-optic gyroscopes, laser-ring gyroscopes, and MEMS gyroscopes. GPS may be replaced in whole or in part, depending upon the application, using the Inertial Reference Systems (IRS) Method. An IRS-based PID can be used for a PID to know its location and the direction of its axis in space or even its orientation. Here, the PID will still need rangefinding to determine its target's location.

In addition to the direction of the PID's axis in space, the distance to the distant point is determined. The laser is used as a rangefinder. The laser beam should be collinear with the front and back reference points. The PID's effective range will be limited only by the observable range of the laser. As such, it will be useful to include a telescopic sight and/or the ability to zoom the lens of the video camera. The location and direction in space of the PID's axis combined with the range to the distant point can precisely, accurately, and uniquely determine the location of the distant point in space pointed to by the PID.

Another method, which can be used to either to increase to the precision and accuracy of the PID's pointing from methods above or alone (detailed below), uses a 3D model of the vicinity made from satellite (or other) imagery, or in other ways.

1) Establish a rough first-order approximation of the PID's location and perhaps the direction of its axis via GPS, IRS, user-entry, or other means. The PID uses this information as well as its measured or estimated approximate range to the target to define a first-order approximation of the location of its target. Then, software:

2) compares the image from the PID's video camera of the context of the Item (e.g. the building the Item is in) to the very small part of the model that is within the error bars of the PID's calculated Item location;

3) identifies the context via image recognition;

4) looks up the context's exact location in the model;

5) computes the location of the Item from its location relative to the context. In this way, the actual location of the Item can be determined very accurately and precisely. This information, in combination with use of image processing on the perspective of the PID's camera image (detailed more fully elsewhere herein), can provide very precise information as to the location of the PID and the direction of its axis. With nearly every target of interest, or at least its context, it is easy to determine which direction is "up". The rotation of the image from "up" can be used to determine the magnitude and direction of rotation of the PID about its axis. This is the last piece of information needed to determine the PID's orientation.

Another way to perform Step 1 is to first employ the other steps of this method on a known landmark within the PID's range.

As the software improves and/or with a good enough 3D model of the space, Step 1 may be eliminated.

GPS signals are not strong enough in some locations and simply unavailable in others (e.g. indoors). Furthermore, getting the 1cm resolution from GPS is often difficult and always expensive. Thus, it is desirable to eliminate the use of GPS. For some applications, the software can quickly and reliably recognize the context and deduce the PID's location and direction of its axis and/or the item pointed to from just the view from the PID's video camera, without the PID's location or range information. This can eliminate the need for GPS. For example, the PID, like an educated person, can know that a view of the Statue of Liberty indicates a location in New York. The PID can confirm that hypothesis by a match to the Statue of Liberty's environs and its known location and orientation therein. The PID can deduce its orientation relative to the Statue by its view of the Statue. Likewise, the PID can deduce its range from the Statue from the size of the image of the Statue (given information on the PID's optics and imaging) and the laws of perspective applied to elements of the Statue and/or other known visible objects in its view. This range information can be determined by laser ranging, when it is safe to do so and when the reflected laser dot is sufficiently detectible. Furthermore, the PID can calculate the date and time from the shadows created by direct sunlight, if present. The identity of an unknown object in the image may be deduced from its location and/or orientation (LO), perhaps also requiring the time that it was in that LO. Here, the PID can be greatly simplified. In this case, the PID can be a camera cell phone with access to a 3D model of the vicinity or vicinities in which it will operate and software to process that model. The 3D model and/or the software for processing that model may be stored in the PID or accessed from an outside source, such as the internet via the PID's cell phone function. Alternatively, the PID can transmit the image(s) to a distant site where the 3D model and software reside. That site can return and/or utilize the item ID information and/or the LO of the item and/or the PID. Nearly every location on the surface of the land has a unique set of reference points that can be used to uniquely identify any point pointed to thereon and likewise the LO of a PID pointing thereto. The range and viewpoint information can then be used to accurately and precisely determine the position of the PID, if this is needed.

If the Item is a standard Item (an Item whose dimensions are already known, such as a certain type of vehicle), the PID's camera image can be used to determine the PID's orientation with respect to and distance from the Item. If the PID also knows its range from the Item, the PID can determine its location relative to the Item. If the Item knows its exact LO and communicates them to the PID, the PID can deduce its LO more exactly.

A standardized item can be affixed to an object to make it easier for a PID to identify it and/or to determine its, and/or the PID's, LO. Please see the section on LOIDs for additional information on this topic.

A distant device can sense the PID and determine its location and/or its direction in space very precisely. This will be especially useful in situations where there are numerous PIDs in the range of the distant device. An example of such a device is a tower-based or aircraft-based lidar system. A tower's location can be known by precise surveying techniques. The aircraft can use GPS or another (or more than one) distant fixed devices. Please see the section on RFW's for additional information on this topic.

Connection and initialization will be described.

In computer-interface embodiments, as with traditional wireless mice, a host adapter 108 (a card or device plugged into USB port) is linked via Bluetooth or IR to the PID to control the software mouse drivers. The PID tells the mouse drivers where the cursor should be and when a mouse button has been pressed.

Initialization may be needed to establish a mapping between the PID's coordinate system and the software's coordinate system in order to communicate absolute position rather than merely relative movement.

In another variant, called the displayed reference frame method, the computer's software displays a reference frame tachistoscopically a few times per second. Such a reference frame, for example, might be a grid with a unique textual code or barcode at each intersection. This reference frame may be superimposed on the frame that otherwise would have been displayed, so as to minimize its perceptibility to people. The PID images the reference frame with the dot and/or reticle to interpolate or extrapolate the location of the dot and/or reticle in the computer software's coordinate system. Another way to display a reference frame might be for it to be an IR or UV image projected onto the display. We would want to do this from one or more sides not far from the surface of the screen to prevent its blockage by a user in its path.

When the current screen is used as a reference frame, the image on the PID's screen at a given time is compared to that currently on the computer at the given time (thereby using whatever is displayed on the screen at the moment as a "reference frame"). The comparison can be done on the PID or on the computer via its PID mouse driver after the PID has downloaded its image to the computer or the computer has downloaded its image to the PID.

Figure 6:
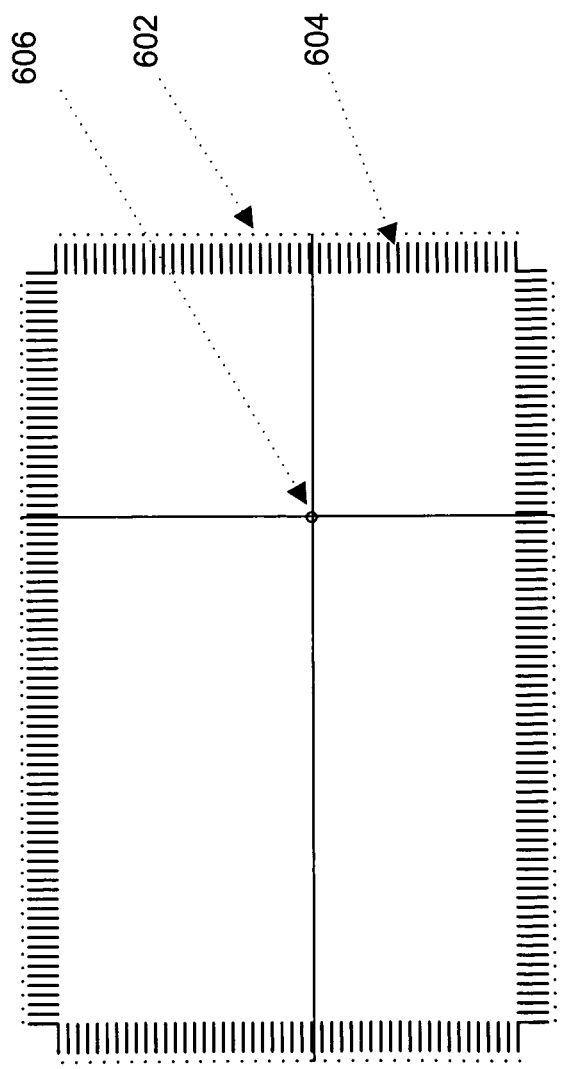
FIGS. 6 and 7 show two sensor arrays for detecting the location of a dot projected onto a display or in the real world by a pointing device according to the first or third embodiment.

A sensor array method requires no sensing of the dots in the PID. As shown in FIG. 6, a linear array 602 of highly directional (in the direction perpendicular to the length of the array) beam sensors is affixed to at least one vertical edge of the display and at least one horizontal edge of the display (or offset from it to get the scatter). The sensors can be made directional in any suitable way, e.g., by a baffle array 604. The horizontal array picks up the horizontal component of its location of the dot 606 from its scattered reflection on the screen and the vertical array picks up the vertical component of its location. The light from the dot on the screen is scattered in all directions. In the figure below, the only reflected rays from the dot shown are those that make it thru the baffles to the sensors. With many dots, it may be advisable to have a vertical array on each of the two vertical edges of the display and a horizontal array on each of the two horizontal edges.

With some types of displays (LCD and others), there can be a 2D sensor array over or under the display layer.

Figure 7:
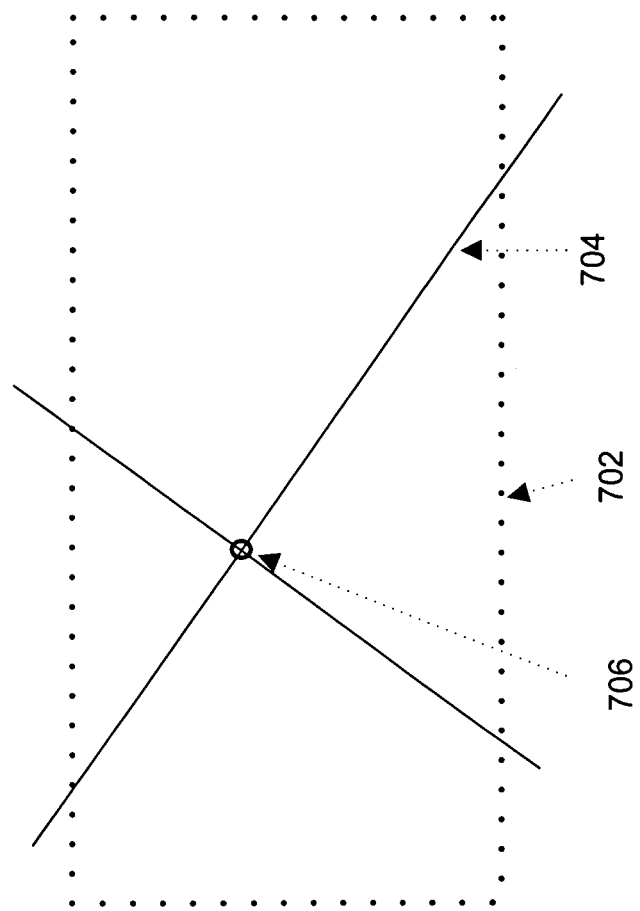

Alternatively, as illustrated in FIG. 7, four linear wide-angle sensor arrays 702 (not sensitive to angles very close to the screen) outline the screen. Here, the laser produces a long, thin cross-hair (reticle) 704 in addition its central dot 706. The cross-hair is implemented to be too dim to be easily seen by people. The sensor array detects the four points where the two lines of the cross-hair intersect the sensor array. The two pairs of alternate detected points define the two lines. The intersection of the two lines is the pointed-to screen location. The cross-hair can be produced by passing a portion of the laser's beam through a template or via a holographic optical element (HOE). The cross-hair should radiate over nearly a full hemisphere to allow the laser mouse to function close to a large screen. The HOE can also perform the dot-identifying beam modulation. The HOE can be constructed to offer a large number of possible modulation patterns. Alternatively, beam modulation can be achieved by turning the laser off and on to create the desired pattern.

With these variants:

1. Multiple laser dots can be resolved by a different pattern of modulation for each beam.

2. The initialization is between the sensor array and the computer's coordinate system. Thus, once initialized, it does not to be done again with a different PID mouse.

3. It can be utilized, in the simplest case, by any laser pointer, or with The Direct Laser Reticle Sensing Method, by a simple laser pointer with a cross-hair. The laser pointer should have a button or other means for the user to designate an Item.

4. If the distance of the sensor array from the display surface is significant, the distance will be needed to accurately compute the dot location on the screen and if the lasers can be expected to come in from angles significantly off from the axis of the display. This distance can be input to the driver or computed during initialization with inputs from off-axis and on-axis sources. If the distance is great, two layers of sensor arrays may be necessary to also compute the incident angle. This will not be an issue in the Sensor Layer Method.

In a feedback method, the PID mouse, in its video memory, compares the location of where it sees the PID's cursor to where it should be seen on the screen (coincident with the dot/reticle) then commands the computer to move the cursor to correct any deviation.

If the cursor gets out of the PID's view, the PID commands the cursor to move using a Quadrant Search until the cursor is back in view.

An efficient way for an uninformed cursor search is a 2D binary search of the computer's display. Here, the cursor first goes to the center of the screen. If the PID does not see the cursor, the PID commands that it be moved, one at a time, to the centers of the four quadrants of the screen. When the PID sees its cursor, it stops looking and begins correction. If the PID doesn't see its cursor at the center of any of the quadrants, it searches each of those quadrants by going to the centers of each quadrants' subquadrants. This process can be repeated quickly until it finds the cursor, even with a small PID video camera view angle. Alternatively, in an informed quadrant search, if the PID has reason to believe that its cursor is in a given quadrant (or subquadrant), it can search the quadrant (or subquadrant) first.

A PID mouse can be implemented using an Inertial Reference System (IRS) in a PID. An IRS is a compact device, typically employing three rate integrating gyros (MEMS, a variety of fiber optic, Tuning fork, etc) to provide absolute roll, pitch, and heading information (after orientation) (see www.automation.hut.fi/edu/as84145/Gyros.ppt). $\Delta X$, $\Delta Y$, and $\Delta Z$ location information can be determined via 3 accelerometers (e.g. ADXL accelerometers) measuring mutually perpendicular accelerations (e.g. MEMS) and the elapsed time. Once an IRS PID Laser Mouse is initialized (this includes orienting the gyros), the PID Mouse will send information regarding its change in location and its direction in space to the computer's mouse drivers. The drivers then calculate where on the computer's display the laser pointer is pointing. The computer then directs its cursor to the screen location. Because such devices tend to drift over time, the initialization may need to be redone every several hours or days.

Frame-compare embodiments image a frame without a dot to compare it to a database of frames to determine that frame's ID. When needed, they also image the frame, with a dot (or reticle), to determine the dot's location relative to the frame in the database. Generally, frame-compare embodiments do not need to communicate with the display, typically a TV or movie screen. It may be helpful for the PID to record an image of the TV screen when it is off from the location where it will be used, to calibrate the PID for glare on the screen. This probably will not be necessary as a Polaroid filter on the PID can remove most of the glare and/or the PID's image processing can remove it (or simply ignore it). At the point the TV becomes interactive enough to require cursor control from the PID, it can do so using techniques described above with regard to the computer interface embodiments.

Another way to implement a PID Mouse is by detecting the outline of the computer screen. The PID's coordinate system may be based on the outline of the computer's screen, an object it can recognize. Due to possible overscan, it may be difficult for the PID to infer the software's coordinate system. Thus, at initialization, the PID commands the software to display various points at specific locations in the software's coordinate system (perhaps on near each corner of the screen). The easiest way to retain the mapping when the PID is in different locations is to keep the entire outline of the screen in the PID camera's view. The PID can tell from the screen's outline how far it is away from the screen and the angle and orientation of its axis from the screen's plane. The computations necessary to make the mapping of this information into the computer's coordinate system are done in the PID's drivers resident on the computer. The mapping is still easy to do with the distortion caused by a wide angle lens that might be necessary to keep the outline in view when close to very large screen.

If the screen is outlined by retroreflective tape, with an extra piece to designate which side is up, imaging the outline will be very simple when illuminated by a source on the PID (e.g. via the laser or an LED). This method, in combination with imaging the dot, will be simple and reliable.

A variant of the Screen Outline Method using retroreflectors can be implemented relatively inexpensively. Here, at least 5 retroreflectors are used to define the screen outline, for example, one at each corner and one in the middle of the top of the screen's outline. The four at the corners define the screen's outline; the fifth defines which side is "up". (The retroreflectors do not need to be near the screen's outline.) Wide-angle retroreflectors are desired to allow for effective operation close to the screen. These five reference points may be imaged as a variant of the Screen Outline Method.

In the instant method, the direction that each retroreflector has with respect to the laser's beam direction is determined. The retroreflectors can be illuminated by a light on the PID mouse, and a direction sensor on the mouse can determine the direction of each of the retroreflectors.

Preferably, the laser scans the space in a spiral (or other) scan. The scan is preferably done by deflecting, using a rotating holographic optical element, a portion of the laser beam that produces the mouse pointer dot. Here the sensor on the PID mouse need only detect the retroreflected light. The direction is known because, at that particular instant, the scanning beam is only going in one direction. The range for each retroreflector and optionally, the dot, can also be easily determined as described elsewhere herein. The range information simplifies the computations of the dot's location in screen coordinates.

The three relatively collinear retroreflected dots will represent the "top line" of this "outline"; the other two can be used to determine the other three lines of the outline. By mathematically defining the outline's top, the PID mouse will work when tilted, inverted, or when the screen is on the floor or ceiling. During initialization, the relationship between the "outline" and the computer's coordinate system is determined. The relationship is independent of the line in space defined by the laser's beam. When the mouse is in use, the relationships of the directions of the light retroreflected from the reference points and their ranges can be used to determine the line in space defined by the laser's beam and its intersection with the screen, and therefore (after computation) the location pointed to in the computer's coordinate system.

This method (and at least some of the others) provides the range of the PID mouse from the screen and the direction of the PID's axis relative to the plane of the screen. Either or both pieces of information can be used as additional variables in a computer game or simulation. Together, these pieces of information represent the orientation of the PID's axis and the location of the light emitting end of the laser. They can also be displayed on a 3D display or 2D representation of a 3D situation.

This method does not require the use of a video camera and requires few, if any, of the cell phone functions. It does not need to see its dot to know where the dot is pointing, so it does not need to modulate the beam to distinguish it from others. As a result, this method provides an inexpensive and flexible PID Mouse.

In a variant of this method, the dot can also be sensed and discriminated from the retroreflectors by its lower intensity (because its reflection is not via a retroreflector).

In another variant of the Screen Outline Method, called the GPS analog method, the retroreflector reference points in the retroreflector direction method are replaced by reference points that are transmitters of visible light (e.g. by LED), radio, UV, IR, or ultrasonic radiation that transmits over a wide angle. The transmitters emit different transmissions so that they can be discriminated. In this case, the $5^{th}$ reference point is unnecessary as the transmitters identify themselves (in many cases when there is no need to synchronize the clock(s) in the transmitters to the clock in the PID, the $4^{th}$ reference point is also unnecessary). If the transmissions contain information similar (or identical) to GPS, the PID can interpret them as a GPS receiver does. This is a much simpler problem than GPS, so the signals and their processing can be simplified.

One issue with the GPS Analog Method is coordinating the reference time between each of the transmitters and the PID's receivers. Sophisticated techniques deal with this in GPS, but the satellites also have expensive atomic clocks. Techniques of some complexity have been used to deal with this with indoor pseudolite-based systems, but their resolution still appears to be limited to about 1 cm.

A preferred solution to the synchronization problem is for the PID to use methods that only require measuring changes in the PID's local time. In one such method, if transmitters are to be used, their transmissions are triggered by the PID. The transmitters can be made such that the delay between the receipt of the PID's trigger signal and the target transmitter's response transmission is very precisely known. Thus, by measuring the time between trigger generation and receipt of the transmitter's response, the PID can compute the actual time of flight of the trigger signal and/or the target's response and therefore precisely calculate the range of the transmitter. By this method and because the transmitters are not moving (like satellites) their reference time is not needed.

Each of the PID's reference point location sensors may send a different code to the target's reference point transmitters. The target's reference point transmitters can echo the code so that the PID knows which of its location sensors is being responded to. Likewise, each PID can transmit a unique code so that a given PID (of multiple PIDs) will know which target reference point transmitter transmission was triggered by that PID. A PID can also use Intervallic methods described below to differentiate return signals from those intended for other PIDs and the responses from various target reference points from various of the PID's reference points.

These approaches vary substantially from GPS. While the means for implementation are generally quite different than GPS, a similarity in functionality to GPS is recognized. Rather than just a screen outline providing reference points for a PID to determine where on that screen the PID is pointing, this technology and variants thereof can also be used to as a set of reference points to assist objects in general to locate and track their locations. The reference points do not need to be in the proximity of the computer. If the reference points are located in the corners of the ceiling, for example, those reference points can define a 3D coordinate system for the whole room. Additional reference points may be required for enough of them to be visible for most applications.

Beyond GPS, this system of reference points can be used to actively determine the locations and orientations of objects in its vicinity. Henceforth, this "fixed" set of active and/or passive reference points will be referred to as a Reference Framework or RFW.

Now we can use a "GPS PID" or suitable variant as our PID Mouse. In this environment, the direction of the PID in space can be precisely determined via its interaction with the RFW. Any suitably equipped device can know where it is in the RFW-defined coordinate system and hence its relationship to any other objects whose locations and orientations (LOs) are also known. The PID Mouse can digitize the LOs of objects in the room to make a mathematical model thereof. The objects can include the TV's and/or the computer's screens' outlines. This permits the PID Mouse to perform PID Mouse operations (when pointing at the computer screen) and PID Frame recognition and Frame location operations (when pointing at the TV) and allows it to know which function it is performing at any given time by virtue of it knowing what it is aimed at.

As expanded upon later herein, many types of objects may actively track their locations in an RFW-defined coordinate system. Likewise, the RFW may actively track objects in its coordinate system. The utility of many methods described herein is independent of whether, for example, one element is in an RFW's reference point(s) and its complement is in the reference point(s) of an object in the RFW's coordinate system or if that element is in the reference point(s) of an object and its complement is in the reference point(s) of the RFW. Thus, herein, the terms "source" and "target" refer to these conditions. Likewise, a PID can often be a source or target to an RFW or another object in the space.

We can now revisit the use of reflectors without the need to scan the space for them. One benefit of reflectors is that if we use retroreflectors, the signal returns back to the source, allowing a given retroreflector to "process" multiple signals simultaneously. Again, only the PID's (or other source's) time frame needs to used. This requires a mechanism for the PID source to distinguish the target's (RFW or object in RFW's DS) reference reflectors. One such mechanism is for the target's reference reflectors to identify themselves. Following is a variety of methods for them to do so.

1) Modulated Reflectors: A retroreflector (or other reflector) may be modulated. The easiest way to do this is to have an LCD or other window (any of the methods for "smart windows") cover the reflector. The window is "opened" and "closed" in a pattern to modulate the reflected beam. The modulation pattern is specific to the reflector and may also encode its ID and/or its location in the DS (or the GPS earth-centered, earth-fixed a.k.a. ECEF coordinate system). Microsphere retroreflectors are preferred as they have the same beam path for light from any direction.

2) Frequency-specific Reflectors: Light, for example, may be emitted across a spectrum via a white LED. Each such reference reflector has a frequency-specific coating that selectively transmits a portion of the white LED's spectrum different from the portions transmitted by each of the other reference retroreflectors. Thus, all of the returned light in each portion of the spectrum is associated with a specific reflector. We may need to impose a signal on the LED-emitted light to distinguish it from ambient light (or we can use a portion of the spectrum with low ambient levels).

3) Fluorescent targets: Here the PID transmits UV light and each reference target fluoresces at a different frequency from every other in this DS. The first two can be used with retroreflectors. Fluorescent targets return light in all directions, but it can be very frequency specific and there is a wide variety of fluorescent materials available.

For a way to synchronize clocks sufficiently for local GPS-style applications, see "S2C"—detailed elsewhere herein.

The locations and orientations of an RFW's reference points relative to one another must be known precisely. If the reference points are mounted in the wall or ceiling, changes in temperature, humidity, and/or the settling of the building can alter their previously known values. One solution is to measure them before each use by use of a single reference point.

A laser, for example, at the single reference point can scan the more distance reference points to determine their current locations and orientations with respect to it. Said laser's beam can be split so that the same beam locating one or more of the other FRW reference points can be used by one or more of said reference points to scan the RFW's DS.

A simpler alternative to measuring the distance and orientation between the RFW's reference points before each use (or ever, by the user), and therefore my preferred embodiment, places all of the reference points on a single physical framework one whose dimensions are not easily subject to change or are at least easily predictable. If this framework is aluminum, for example, it is easy to precisely and accurately calculate the changes in distance and orientation between the reference points as the changes are a simple function of the coefficient of thermal expansion of the particular alloy used. Aluminum is good choice also because it is an efficient conductor of heat, thereby reducing localized variations in its temperature. The PID can measure the DS's temperature, or if there are large temperature variations in its DS, the RFW can have a thermometer and communicate its temperature to the PID (directly or indirectly). A large RFW can have multiple thermometers. The relative angles between all pairs of the reference points will not substantially change. Likewise, if the RFW is prefabricated, the locations of the reference points at a known temperature can be very precisely determined at the factory and is unlikely to change. A preferred configuration for the RFW is a point (this one may or may not be a reference point) with three, often equal-length, mutually-perpendicular rods extending from the point. A reference point is mounted on the end of each rod. The RFW can be unobtrusively mounted (at a single non-compliant point with possible other lengthwise compliant mounts, so as not to stress the RFW) in a ceiling corner of the room chosen for the least "shading" of the DS it defines.

For even less "shading" or to increase the angular distance between reference points, multiple RFWs can be used. If they are on a common framework, it becomes one RFW again. Otherwise, if the PID averages the different sets of locations from the different RFWs, this should minimize the sources of error. Alternatively, the RFW may have a 3 or more reference points at or near corners of the ceiling and maybe others in between.

One PID reference point can provide the location of one point on the PID, but not the PID's direction in space. Two PID reference points collinear to its axis can define the direction of the axis and the locations of its end points. A third reference point preferably located on a perpendicular to the axis emerging from one end (preferably the axis' "back" can define the location of the point and the amount of rotation about the axis. This configuration can provide complete information about every location and orientation in and on the PID that is fixed with respect to the three points.

In many implementations, all three of the PID reference points may be "transceivers" that actually use a single transmitter and/or a single sensor. All light (for example) emitted from all three PID "transceivers" may have a single source and pass thru separate optical fibers (or other appropriate waveguide) before being emitted into the DS. Likewise, all light (for example) received from the DS may have passed thru separate optical fibers (or other appropriate waveguide) before going to a single centralized sensor. Timing computations will be simplified if the length of each of the fibers is the same. With a single sensor, it may be necessary to sequentially send the transmissions so that the PID can easily determine which receiver received which response.

Synchronization by Waveguide Length (SWL): A simple method to synchronize signals is to have them all originate at a common source and all travel to designated locations at the same time. The designated locations will typically be displaced by different amounts. To correct for this, the signals can each travel along a waveguide of the same length. Thus, they will all arrive at their designated locations simultaneously. This method, simple Synchronization by Waveguide Length (SWL), can be extended by using different lengths of the waveguide to cause the signals to arrive at their designated locations at pre-specified different times. If the staggered waveguides end up at the same designated location, they can function as a single pulsed signal.

Simple Synchronization by Waveguide Length (SWL) can be used to synchronize all of the RFW's reference points and the PID's clock. Here, the same length of optical fiber (assuming the signal is optical) goes to each RFW reference point and to the PID (plus the length of optical fiber in the PID from each receiver to the PID's common sensor) from a single source, e.g. the first point described when the RFW is introduced. Thus, the PID and all of the RFW reference points receive the signal at the same time. Consider the time the PID receives its sync signal as t=0. The time that the signal arrives from each RFW reference point after t=0, multiplied by the speed of light in air will be the reference point's distance from the respective PID sensor. To distinguish the signals from the RFW reference points, each can have a different modulation pattern or a different frequency band. A master DS can synchronize others nearby using a fixed length of temperature-monitored optical fiber. That will permit a PID to go from one DS to another.

The disadvantage of this method is that it requires the PID to be tethered to one of the optical fibers. The tether could be quite long, but a tether would be cumbersome, so this is not the ideal solution.

One way to reduce the inconvenience of the tether is to plug into it just long enough to synchronize the PID's clock to the clock of the DS defined by this RFW. Equivalent to this will be to put the PID in a location whose location is precisely known to the DS.

The mathematical model of the room makes it simple to input into architectural, remodeling, or interior design software. Having digitized the locations of the room's objects, one can select an object to find. The PID knows where it is and tells you which way to point (via arrows on its screen or LEDs representing up, down, right and left) to find the object.

Likewise, the "room" can be the inside of a store (where the PID can help the user find particular Items) or a street-level outside space defined by reference points on the surrounding buildings. The responses made by dedicated units and/or this feature can be included in local laser channels, on cell tower transmitters, on utility poles, or on street signs. The RFW reference points may be passive. When the RFW reference points are transmitters, this is a modified GPS analog. Additional RFW reference points will be needed as a user moves outside of the range of the local ones. Such a system can be far more precise and use much less expensive equipment than GPS receivers. As this system comes more into use it can be used in conjunction with GPS in vehicular navigation systems.

The preferred embodiment permits the user to view the coordinates in the reference frame of the room (or outdoor space) or as GPS coordinates. However, linking the two coordinate systems may not always be practical or necessary.

I anticipate that variants of RFW-based location will be accurate to less than 1 mm. Being far less expensive to implement than GPS, this variant of the PID will make practical the accurate and precise digitization of the locations of objects in everyday life. This, in combination with fixed reference points (retroreflectors, transmitters, or other fixed objects), allows for the practical creation of a Digitized Space (DS) in many environments.

The PID will not need to be on a tripod as it can compensate for its motion as it digitizes objects in a DS.

The following DS features are useful to support applications.

Each DS should have a unique ID. This serves many purposes.

1. It allows the PID to lookup the locations of the reference points to function properly in this DS.

2. It allows the PID to lookup the locations (and location history) and/or identities of the objects in the DS (if it has permission to do so).

3. It may allow the PID to map the coordinate system of the DS to other DSs and/or to the ECEF GPS coordinate system.

By having a precise and accurate digital model of a space, devices do not need to be very smart to navigate the space. Such a model can easily include the topography (see surface and texture mapping discussion elsewhere in this document). The locations of trees, rocks, and other fixed objects can be easily digitized using a PID.

Once the location of an object is mapped to its identity, it can be identified. Likewise, from its identity, it can be located.

The digitization of an object can include that object's orientation in the DS. Additional information can be provided for a portable object such as the location of its center of mass relative to the object's reference points and convenient places on the object to grasp it for lifting, turning, or dragging. The information will be useful to robots.

Once the LO of an object is mapped to its identity, it can be identified by using a simple look-up table with the object's location as input, yielding its identity as output. Because objects occupy a volume, generally the lookup's input will include many ranges of locations. This might be easiest to store as a number of cross-sections along a particular axis (e.g. the vertical axis). A hierarchical lookup search may be helpful to expedite this process, e.g. look first at the z-locations of all objects in the vicinity to weed all but those objects with a surface that high. Then repeat this process on the x-coordinate, then, if necessary the y-coordinate. Realizing that the PID "viewing" the object is looking from a particular spot in a particular direction may further simplify this process.

Likewise, if a known moving object continually reports its location, or if the location can otherwise be determined, it can also be identified by its location at some point in time. For example, I am driving in my car and want (or need) to communicate with another driver. I point my PID at the driver's car. My PID determines the location (at a given point in time) and looks up the driver's identity. The driver's location is known because the driver's PID is constantly telling our site where he is. My PID calls his PID. If the driver so chooses, the driver can allow the call to connect.

It will be easy to track an object in a constantly monitored DS without needing to constantly perform a formal identification of the object. Conservation of mass requires that if an object was at x1,y1,z1 during t1, at t1+Δt, a similar object should be at x1+Δx, y1+Δy, z1+Δz (where all of the Δ's can be predictably small). If the object's identity is established once, it will continue to be known as the object is tracked (forward and backward in time). As the object moves from one DS to another contiguous DS, the tracking information can be supplied to the second DS for the tracking to continue.

If the distances and directions between the DS's reference points (retroreflectors or transmitters) are accurately known, the units of the DS can be standard units of length (e.g. cm or inches). If the locations of the reference points are known in GPS coordinates, then it will be easy to map back and forth between the coordinate systems. Otherwise, the DS's units can be unique to that DS. Note that fixed objects can also serve as reference points.

The following technique for object management is by itself known; however, its use in the context of the present invention is considered to be novel. Using a PID, record the locations or LOs of all relevant objects in a DS to create an initial inventory. Whenever a relevant object is moved, the PID is used to tell the DS database that the object is no longer at (x1, y1, z1) of DS ABC, it is now at (x2, y2, z2) of DS DEF. The object can be identified by a tag such as a barcode, an RFID tag, or just entered by the PID's user.

This will, for example, be useful for parents to keep track of their children. In a very simplified variation, I imagine children on a school playground with a PID viewing the area. Each child has a multiple barcode ID stickers. If the PID doesn't "see" any given child in a prescribed time period or if it "sees" any child leave a prescribed area, it sounds an alarm and indicates where the child was last "seen."

In a DS, the PID can know when it is in or close to an area of interest. A PID connected to a site with a database of such areas can, for example, inform its user of local channels (discussed elsewhere herein). A PID can inform its user that the user is near a location where the user wanted to pick up an item.

Events can be driven by location, orientation, or LO. Today you tell your PID, "Whole Foods, eggs". Tomorrow you tell it "Whole Foods, tea". Your PID knows the location of Whole Foods or recognizes when you have entered its DS. Thus, next week, when you enter a Whole Foods store, your PID knows that you are there and reminds you to get eggs and tea. Further, it can remember where you got eggs and tea last time you were at that store. Alternatively, the PID can access Whole Foods' DS system and ask it where eggs and tea are. It tells your PID that then leads you to the locations of the Items along the quickest path through the store to get all of said Items. Your PID tells you to turn left, right, forward, back, up or down (with the PID) via arrows on its display and/or sound through its speaker. Following your PID's direction, said PID's laser will point directly at the next Item. This capacity to remember and help user's find things will be especially useful to older people whose memory is failing.

Robots keeping track of their location is described in the literature, however, its use in the context of the instant invention provides increased resolution and lower cost. A robot with a LOID can be tracked by an RFW. The RFW can continuously inform the robot as to where it is and where obstacles are, or can tell the robot the path to take. A PID equipped robot in a DS can easily navigate the DS and identify objects and the object's orientations in the DS. This opens up many new applications for simple robots. Such a robot can easily and precisely cut the lawn. Specialized robots can be used to build, renovate, and/or repair buildings. A DS can help robots and/or humans to build or repair large objects such as aircraft and ships and can help all building to be very level and plumb.

A PID in a DS can display the DS's coordinate system, names of inventoried objects, etc over the image of the DS in the PID's display.

The PID can display otherwise non-visible objects such as the insides of walls to view the locations of studs, wiring, and pipes or "see" thru objects to display what is in other DSs. The PID can display underground utilities.

As discussed in the section on PID's, a distant device can sense a PID and determine its location and/or its direction in space very precisely. RFWs, for example, with transceivers or just receivers (if the targets have their own light sources) can perform this function. The RFW then is like a fixed PID that defines the coordinate system for a Digital Space (DS) and locates points and objects within the DS. A mobile PID can be a simple laser pointer. The RFW's receivers pick up the scattered laser light from the laser pointer and the RFW calculates identify the exact location in the DS of the scattered light. The location information can be sent to the PID or directly to where it is needed.

For example, if the scattered light's location maps onto where the RFW knows there is a computer screen, the RFW (or PID) can send the information to the computer's mouse drivers to direct the appropriate cursor to the screen location or just click on the location. If scattered light's location is mapped to a TV screen, the information is used as a TV remote or for PID Frame location purposes.

From the previous paragraph, it is clear that once an object is known to a DS, pointing to the object can result in object-specific actions. From the previous paragraph, it is also clear that specific locations on the object can result in location-specific actions. Elsewhere herein (in the context of games), it was discussed that actions specific to the PID's orientation can occur.

Another way to designate points (or areas or volumes) in a DS is via a 3D mouse that shows its location in an image of the DS on a computer's screen. One way to implement such a 3D mouse is what I shall term a "pushdown mouse". A pushdown mouse is a normal 2D mouse on a mouse pad where the plane of the mouse pad is spring mounted (or utilizing some other force sensor), for example. Pushing down (harder than the normal weight of one's hand, etc) on the mouse pad causes the plane to slide down. This motion is detected indicating cursor movement in a lower plane, parallel to the plane before pushing down. Releasing downward pressure (or pulling up) indicates cursor movement in a higher parallel plane than before the release (or pulling up). A given location of the plane can represent a constant Z location in X, Y, Z space or a plane oriented otherwise in the space. In addition to sensing vertical forces on the plane, sensing rotational forces (with or without actual rotations) for roll, pitch and yaw can provide input for real-time reorientation of the plane.

In general, to keep track of an object in the DS, the RFW-based system (or a PID or any type) can detect an array of targets, such as reflectors, retroreflectors, or light or other radiation sources on the object. The array can represent significant points on the outline or orientation of the objects.

A cost-effective way to achieve this is will be to use a two-dimensional retroreflective barcode on an object. Such a barcode will be a 2D pattern of retroreflective points (dots).

Embedded in the pattern is a special pattern of certain of the dots that can indicate the local reference system of the barcode. This can be mapped to the reference frame of the object (e.g. the directions of its major axes (see the LOIDs discussion on using 3 points on a PID to identify its orientation in space—2 points used to define the location and direction of a directed ray in the DS and a third to define the rotation in the DS of the ray). The certain retroreflective barcode points can also be used to make it easier to translate the barcode. The barcode can have additional information encoded therein or just an ID such that the additional information can be looked up. The additional information might comprise: an inventory control number; a description of what the object is; a record of where it has been located and for what time periods; information to assist robots or humans to move or repair it; etc.

The 2D retroreflective barcodes can be printed on objects before they are shipped from their manufacturer. The 2D retroreflective barcode can be custom-made on anyone's computer by having a sheet of label stock, covered with a retroreflective coating. Over the coating, one's printer prints a relatively opaque coating to cover all but the pattern of points that one wants to be retroreflective. The color(s) (and pattern) of the opaque coating can blend with the object onto which it will be placed. The coating can be applied using the printer of one's personal computer. Label stocks can be supplied that will be compatible with ink-jet, laser and other printer technologies.

If the Item is moving and the user provides occasional location information, the user can determine its location, speed, and acceleration to predict where the target will be at a given time. The camera, coupled to image processing software, is better at providing information on a moving Item. Doppler shift information will be useful if the laser alone is used to measure velocity and acceleration in the direction toward or away from the user.

If the user is keeping track of multiple moving Items, s/he may need to communicate which Item a given set of data is associated with. This Image Processed Video can assist this process.

Specific applications of the PID will now be set forth.

The PID can be used to determine the location on a frame for Frame Location applications. Here a mapping must be established between the "absolute" world locations produced by the PID and Frame's coordinate system. The ranges are generally not great here. Simple GPS Replacement or Sensor/GPS methods may be appropriate here.

The PID can be used to determine a location on a computer screen. Here a mapping must be established between the "absolute" world locations produced by the PID and the computer's coordinate system. Once that mapping is established, there is no need to display reference frames even when the entire screen can not be seen in the PID's camera. The ranges are generally not great here. Simple GPS Replacement or Sensor/GPS methods may be appropriate here.

The Item's identity may be deduced from its location. The time associated with the location may be needed if the Item is mobile. The Item's location can be compared to a database of locations of known objects This method of "absolute" location can be used for many applications, such as surveying.

For long-range pointing applications, it may be important to stabilize pointing of the dot/reticle. To reduce dot movement on clicking, it is important to separate the holding function from the clicking function. For example, I notice that when I flash a laser pointer that I am holding, the change in force on the button disturbs the balance of the forces used to aiming it, thus changing the aim point at the very moment of selection. This can be reduced by holding the pointer between the two fingers adjacent to my thumb, and clicking with the thumb. This approach is used in rifles and pistols, where pulling the trigger is accomplished by different muscles than those that aim the weapon.

Gyroscopes in the PID can be used to reduce jitter, the slight shaking of the image. They should be chosen to deal with frequency of jitter characteristic of people.

The PID can use the average location of the dot/reticle with respect to the frame over a given time period to reduce jitter. The PID can use the average location of the dot a fixed (short) time before the click to eliminate displacement caused by the clicking action. The PID can determine that the user is attempting to track a particular object in the frame.

As noted above, the PID should have one or more buttons, to function as mouse buttons and for other purposes. If the laser PID has gun-style pointing, a trigger-style clicking is probably best. If more than one trigger is needed, the levered trigger can be replaced with multiple buttons, perhaps side by side, that can be pressed using the trigger finger.

If the PID has laser pointer-style pointing, the thumb of the hand holding the unit can be used to activate one of two (or more) buttons or slide one to the left or right. Either way, a sliding action will probably alter the aim the least.

For the camera PID, there are many ways known to hold cameras and/or video cameras and to push buttons at the same time, many of which are appropriate here. One version has a pistol grip and the camera's screen can flip vertical to be viewed in extended arm pistol position or horizontal (perhaps with sights) to look at the laser dot and not the screen or to look down onto the screen.

When pointing at an Item, it will not always be easy for the PID to know which Item the User is interested in. For example, the frame shows part of the inside of a room. There is a painting on the wall of the room. The painting depicts a person and other objects. If the pointer is placed over the wrist of the person in the picture, the PID does not know whether the user wants to select the picture, the person, or the bracelet the person is wearing. Thus, it will often be useful for the PID's display or another display that the PID communicates with (such as the computer or TV screen on which the user is viewing the Item) to highlight or frame (e.g. via laser outline) the Item that the PID hypothesizes that the user wants, thus allowing the user to select that item or specify a different Item. Techniques for further specifying an item will be disclosed.

To further specify an item, the user presses a "click up" button to select on the larger likely Item or "click down" to select the smaller likely Item. The "click up" and "click down" buttons can correspond, e.g., to left and right mouse buttons on a typical Windows-compatible mouse. For example, a PID hypothesizes that the user is interested in the person. The PID's display subsystem then highlights the person. The user may "click up" to specify the picture or "click down" to specify the bracelet. Click up and click down can be achieved by two buttons or a single elongated button where the user presses the top portion to "click up" and the bottom to "click down". When viewing an object in the PID's display, it will probably be useful to zoom out with a "click up" and zoom in with a "click down". This is referred to as "Click/zoom". When directly viewing an Item or viewing an item on a screen that the PID can not control, clicking up or down can display a laser frame around the Item.

Zooming the camera in or out while keeping the dot/reticle on the Item can trigger a "click up" or a "click down". This will work well for direct viewing and PID display viewing.

For frame adjustment, lock one corner of the laser-drawn (or video camera displayed) frame. Expand or contract the width and independently the height of the frame to frame the Item to be specified. The frame can be viewed directly or on the PID's display. Frame adjustment may also trigger a zoom.

The PID can be used to determine a frame ID and frame location in any of the following: broadcast television, a show in DVD or videotape, or a motion picture in a theater. In a live theatrical production, the location on the stage rather than the frame is determined. For a radio broadcast, the microphone can be used. For many such applications, the PID with a reticle only, as in FIG. 3, should be used to avoid distracting other viewers or the performers. Alternatively, the PID of FIG. 5 can be used with the laser turned off.

A mouse pointer can be combined with a laser pointer for large displays, and a mouse can be provided for large displays, e.g., in a war room or a multi-player game. It is like a touchscreen in that the user points directly at the point of interest on the screen (unlike a mouse), except that it works over a long distance and provides multiple clicking options like a mouse.

A real-world object can be pointed to by specifying its "absolute" location in space and the time and pointing at it or framing it. An item's tag can be read, or its identity otherwise deduced.

The laser and/or reticle provide ways to do other aiming. Aiming improves the PID's effective range and its effective resolution and provides a wider-angle view to find the target for a narrow-angle sensor or efferent device. The laser provides the widest angle view. Aiming can also make communications more private. Laser PID walkie talkies aimed at each other can communicate securely over a line-of-sight range. Aiming provides the capacity to draw or frame an outline around an area or volume and the capacity to specify a past or predict a path.

The sensors are aimed in the following manner: point video camera at barcodes to be imaged (not as a barcode scanner), for short-term DVR for Visual Frame Recognition and Frame Location when the Item is no longer on the screen to point reticle to better view laser dot under some conditions many other uses described herein.

A telephoto lens can be pointed, as can a directional microphone to record a soundtrack for Audio Frame Recognition to record a voice for to identify someone (e.g. verify the User).

Aim directional sensors at IR, UV, or radio (e.g. Bluetooth) "sources" (transmitters, reflecting surfaces, refracting volumes).

The laser (or another collimated beam) can also be used to illuminate a barcode, especially a retroreflective one. Here we may want to be able to increase the beam diameter by divergence or collimated widening (this decreases divergence).

A directional UV light or a UV flash can be used to illuminate a fluorescent barcode. A directional radio source can be aimed at a target. An IR, radio (e.g. Bluetooth), or other transmitter as a device remote for TV, DVR, Cable box, Satellite Box, VCR, DVD, Computer, etc. Psiloc Mobile Solutions produces software called "Total irRemote" that permits certain cell phones (5 Nokia and 3 others) to serve as an IR remote for "TV, HiFi set, CD, VCR, DVD players . . . " (www.psiloc.com/index.html?id=152)

Aim effector/sensors can include a directional ultrasonic or IR rangefinder, a directional RFID reader, or a projected laser grid. The images of the distortions in a fine grid projected by the laser into a portion of the PID's video camera's field of view can provide substantial information about the shapes of the surfaces onto which the grid is projected. The grid may be projected thru a template or scanned via a rotating HOE.

The ranges of the points defining the grid can be color coded to provide the user with valuable information. A range of the ranges (distances) can be ascribed a particular color or shade of a color.

Also, the information about the ranges of the points can help software to process the video information. This may be quite helpful in PID and other applications. The range information can be used to find edges. If the range information is precise enough, it can also be processed to map the textures of viewed surfaces. The edge and texture information can help to recognize objects in the PID's view.

The information can be processed to digitize 3D surfaces, to aid in the identification of some objects, to digitize a person's body outline for mass customization, to more precisely designate a location on a 3D object, for measuring the distance to the pointed-to object and measuring the angle of incidence of the main beam to the intercepted surface. The continuous motion of the PID's video camera from many angles can provide detailed information on the surface.

An area or volume can be specified on a Show's Frame, on a computer display, in World. The area or volume can be outlined by the laser and/or reticle's path as "drawn" by the user. The area or volume can be specified by a frame painted around an area or volume by the beam, or beams, scanned over time and/or spread in space.

To specify a past or predicted path, a user can trace the path that an Item has taken. That information can be input for a "Physics Chip" (Ageia Technologies, Inc.'s PhysX chip, a Physics Processing Unit designed to "accelerate attributes of games software coding to support more life-like action and games . . . supports calculation of . . . rigid body dynamics, . . . finite element analysis, . . . ." www.eetimes.com/showArticle.ihtml?articleID=160901296) to predict the path of the Item, especially if the path is projectile motion. The User can predict the path the Item will take, based upon terrain, etc.

Following are ways to use a PID to identify objects to get more information on and/or to buy.

The PID can be used to allow a user to locate and buy items used in a show. The user points at the show to allow the PID to identify the show, determine the Frame ID. The user points point to the desired location on the Frame. Another way to deal with overscan is to use only the interior portion of the image of the Frame. In this case, the PID uploads the image to a central site. The site then uses one of the algorithms that exist for recognizing an image from a part of the image. A sound track can be used as well. The system presents a show-level catalog and the opportunity to Purchase the selected Item. The user then executes a command to buy the item, e.g., by pressing a specific "buy" button or one of the device's mouse buttons.

An item in the real world can be identified by reading the item's barcode tag, RFID tag, license plate, or other identifying indicia. For items seen in print media, the user can point to pictures or text to identify, for more information and/or to buy. OCR (optical character recognition) is a mature technology that can create a text file from an image with text in it. This may be done on the PID or uploaded to a web site for analysis, the results downloaded back to the PID.

For explicit advertisements (those presented as such), the laser or reticle can frame a personal ad, etc. Embedded barcodes can be provided for feedback to advertisers.

For implicit advertisements (e.g., product placement in television shows), the laser or reticle can frame the reference to the Item, e.g. in a novel. The laser or reticle can frame a word to look up or a photo to get more info on.

a photo taken by the PID containing text (in print or elsewhere in the world) can look for web addresses (the www.xxxx.com, .net, .org, etc) with or without the blue underline, highlight such and allow the user to jump to them.

A human being can be identified by voice or a retinal scan. An object's identity can be deduced from its location and the time.

A laser can be used to generate a Frame for a subset of the display area for any camera, not just one on a cell phone, especially if used to designate an Item to be identified.

More detail on the RFW will be provided.

As described earlier, an "L" unit (2DL) (that is, an L-shaped unit with reference points thereon) is used to determine the LO (location and orientation) of an object it is affixed to relative to some other object or space. A 2DL communicates a local reference frame, typically one fixably mapped to the object-centered, object-fixed reference frame of a single Object to another reference frame (typically a PID or RFW). An RFW defines a larger reference frame, one typically containing multiple and often movable Objects. The three reference points of a 2DL and the reference points of the RFW can be transmitters, receivers, transceivers, reflectors, retroreflectors or any other device used to emit, receive, and/or deflect radiant energy (including directed coherent beams). The important thing is that the RFW and 2DLs interact so as to determine the mapping of the reference frames of the Objects to the reference frame of the RFW.

The DS's RFW can determine the location and orientation (LO) in the DS of PIDs and other Objects and the PID's and Object's IDs. Many techniques for this are described below.

A PID can determine the PID's LO in the DS and the LO's of Objects. (Note: An Object, properly equipped, can determine the Object's LO in the DS and report such to a PID or RFW) A PID can keep track of the PID's (LO) and may report the LO to the RFW. Alternatively, the DS's RFW can keep track of the PID's LO and report it to the PID.

The PID can use its laser to determine the direction and range of a point. The point's location can be transmitted to the RFW and/or other devices. The point's location can be used to digitize points on an object. The point's location, if on a computer screen can be sent to the computer's mouse driver to direct the computer's cursor. The point's location, if on a TV can be used to determine a Frame Location.

A PID can directly determine an Object's LO and/or ID via techniques detailed below. The PID may inform the RFW of the Object's location and/or orientation and/or ID. A PID can designate an object for an RFW by activating the Object's LOID, detailed elsewhere herein.

A PID can assist an RFW with location. The PID points to an Object or a point. The PID determines the object's location by pointing PID's laser or US (ultrasound). Alternatively, the PID just designates the object or point by pointing its laser or US at the object or point. Here, the RFW detects PID laser's scattered light. This uses S2C (detailed elsewhere herein) rather than simple ranging. Neither the RFW nor the PID's needs to know the PID's orientation. The PID doesn't need to know anything. The PID generates a US signal coincidently (from PID's perspective) with a laser pulse directed at the point. Part of the laser pulse (or a coincident LED pulse) is scattered so as to go directly to the RFW's receivers. The target point scatters the laser light to the RFW's receivers. Each RFW receiver uses the difference between the first light's arrival and the ultrasound pulse's arrival to determine the range of the PID's laser emission point and the emission time in the RFW's space-time reference frame. From this information, the location of the PID's laser emission point is determined. Each RFW receiver uses the difference in the arrival times of the target point's scattered light from the original emission time to determine the time of flight of the PID's laser to the target to that receiver, and hence the total distance traveled from the PID to the target to each receiver. For each receiver, the locus of points where the target point could be defines an ellipsoid of revolution. The PID's laser emission point and one receiver are the foci of one ellipsoid. The total distance traveled from the emission point of the PID's laser to the target point to that receiver determines the lengths of that ellipse's major and minor axes of the ellipsoid. All of the ellipsoids share one focus (the PID's laser emission point). The point of intersection of the ellipsoids is the location of the target point.

The PID can be simplified to just a laser pointer with an ultrasonic emitter. Optionally, the PID can modulate the laser (or US or LED) to distinguish PIDs for the RFW.

The point's location can be used to digitize points on an object. The point's location, if on a computer screen can be sent to the computer's mouse driver to direct the computer's cursor. The point's location, if on a TV can be used to determine a Frame Location.

Three points are all that is absolutely necessary to determine LO. If two of the three points are nearly collinear with an RFW's reference point, the two points may not be well resolved. Well-spaced RFW reference points helps with this as does having additional RFW reference points, especially if the RFW reference points are well-spaced. Another way to address potential problems with 2DL reference point resolution is to have multiple 2DLs, preferably on perpendicular planes of an Object.

A third way is to use a 3D "L" unit (3DL). A 3DL is a 2DL with a fourth reference point, the fourth reference point forming a second "L", such that the vertical axes of both "L"s are coincident and the arms of both "L"s being perpendicular. This also looks like the corner formed by the points (0,0,0), (1,0,0), (0,1,0), and (0,0,1), for example, (not to imply that any two arms must be the same length).

A 3DL is easy to mount on the corner of any parallelepiped (box-shaped) object. A 3DL is easy to build into the corner of any box-shaped object. The 3DL may simply be 4 reference (or more) points mounted on (or in) different locations of an Object or may extend therefrom. A 3DL may be embedded in a material transparent to the radiant energy it mediates. It may be totally detachable from the Object. A retroreflective 3DL may be printed on retroreflective stock, the label applied by bending the label along its primary axis and affixing it such that the bend coincides with an edge of the Object.

If care is taken to make the two primary planes defined by a 3DL precisely perpendicular, the perpendicularity information can help correct errors in measuring the locations of the 3DL's points.

S2C (Simultaneous Sound and Electromagnetic Radiation Pulses): A way to synchronize clocks especially those separated by space is to use a pulse of electromagnetic radiation (EMR) to designate when it and a sound pulse are simultaneously emitted from a source. EMR is so much faster than sound that, for all but the largest DS, we can treat its speed as infinite. However, it is not difficult to compensate for the finite speed of light, as specified below. The target measures the interval between its receipt of the EMR pulse and its receipt of the sound pulse. This interval (or a corrected version thereof) is the time of flight of the sound pulse from which the range can be computed.

S2C is quite useful as synchronization can otherwise be expensive in many ways. S2C provides a cost-effective way to perform ranging between two objects, without the need for "pulse, echo" ranging.

The S2C pulses do not actually need to be sent simultaneously as long as the receiver has a way of knowing the time difference in their emission. This information may be a standard or transmitted. The time difference may encoded by modulation in one of the pulses. This can render the pulses unusable to all but those who can decode the encoded information. S2C can also be used to synchronize other clocks to the S2C source's clock. The slave clocks can learn from repeated S2C synchronizations to predict the variations in their clocks and adjust them appropriately. S2C pulses may also be encoded to indicate additional information, such as, the ID of the pulses' source (e.g. each RFW reference point in a DS) and/or the pulses' emission time (in the source's time reference frame).

For distance computation, the following formula is used:

$$d=vc(t_v-t_c)/(c-v)$$

d is the distance the pulses traveled from the source of the pulses to the receiver of the pulses
v is the speed of the sound pulse in the medium
c is the speed of electromagnetic radiation in the medium
$(t_v-t_c)$ is the time difference measured by the receiver, note that the receiver does not need to measure either actual $t_v$ or $t_c$ In most media, c is so much greater than v, that we can typically approximate the equation by:

$$d=v(t_v-t_c)$$

There is no value to simplify this further as $(t_v-t_c)$ is what is actually measured. In situations where we can use the second equation, we don't need to be concerned with the variables that affect the speed of EMR in the medium. However, temperature significantly affects the speed of sound in gases. For example, $v\approx(331+0.60\ T)$ m/s where T is the temperature in Celsius. Furthermore, because $v=\sqrt{B/\rho}$, where B is the elastic modulus and $\rho$ is the density of the medium, the speed of sound in gases is significantly affected by pressure, i.e. atmospheric pressure in most anticipated applications. Therefore, for precision S2C gas medium applications, temperature and atmospheric pressure (or simply $\rho$) will need to be monitored when they may vary significantly.

In nDL, PID, and RFW applications, if sound is emitted from each reference point of the reference frame, only one EMR source is needed as the EMR source provides what is virtually a t=0 signal for all of the reference points. The EMR signal can be transmitted from anywhere on or near the arms of an nDL or RFW. Likewise, if the nDL or RFW reference points emit EMR, the first one to be received can be considered $t=t_1$, the second $t=t_2$ . . . the $n^{th}$ is $t_n$. Here the sound emission should be very close to one of the source reference frame's reference points. For example, if the sound emission comes from the same point as the one interpreted as $t=t_2$, its range $d_2=v\ (t_v-t_2)$, for the other reference points $d_i=d_2+c\ (t_i-t_2)$.

Following are several methods to identify the reference points associated with a given target nDL.

The first method to identify the reference points associated with a given target nDL is by Reference Point Modulation. If a target such as a PID or an Object employs retroreflectors in its nDLs to return the source's radiant energy, intelligence can be concentrated in the RFW and the nDLs can be dumb. This technique uses simple time of flight ranging, so there is no need to synchronize the clocks of the Objects (or PID) to the RFW. The RFW can use ultrasound (US or other sound) or electromagnetic radiation (EMR) as the ranging energy.

When the target's reference points are retroreflectors, the source typically does not need to distinguish between the source's reference points as the radiant energy from each reference point returns only to the source reference point. In these applications, only the target's retroreflectors need to modulate the retroreflected radiant energy. Here AM, FM, or phase modulation, for example, may be employed.

When there is a small solid angle between the source's reference points from the target's perspective or in applications where the transmitted radiant energy is scattered at the target, the source may perform one type of modulation, the retroreflector or scattering target (e.g. a fluorescent target) another. For example, if the source differentiates between its reference points by FM, the (retro)reflector can differentiate its reference points by AM. The doubly modulated signal can be easy to decode at its final reception point. Note that if the radiant energy is scattered by its target, a central receiver can be used, however this makes ranging computations more difficult than sending and receiving a given signal at a given location.

In S2C applications, the ID of the nDL can be transmitted with the EMR signal or the sound signal, with the reference point signals or the other signal.

If the ID is encoded in all of the nDL signals (S2C and otherwise), the receiver will be able to distinguish the nDL from others even if other nDLs are transmitting. The PID or RFW may use S2C to activate and synchronize all or some subset of the nDLs. To avoid excessive noise, it may be advisable to have different nDLs transmit or retroreflect only at fixed intervals, the intervals being prime numbers of relevant time units. Those objects with the highest priority may be given the lower prime numbers.

The second method to identify the reference points associated with a given target nDL is the use of Frequency Identified Reference Points. In embodiments in which the reference points emit, retroreflect, reflect, or otherwise respond to different frequencies (e.g. fluorescence), for LO, 3 different frequency ranges are needed, one for each reference point (to tell them apart). This is easier to manage if the frequency ranges of a given nDL are close together. Polling is quite simple, send out white light, and attend only to frequency ranges of target Object. The LO tags can be quite inexpensive.

For LO, a 2DL is all that is required to determine the object's LO if the LO of the ID relative to the Object is known. Application of the 2DL is best done by the object's manufacturer, but the LO tags can be separately manufactured and later affixed to an Object. The LO tags can be made using retroreflective tape with frequency filters over the retroreflectors. An alphanumeric ID, barcode ID, and/or RFID can be included on this retroreflector ID, making it a LOID A disadvantage is that the more objects there are to track, the smaller each frequency range must be, thereby reducing the amount of retroreflected signal, ultimately making it difficult to accurately measure Solution A—Use a tunable source in the RFW. If the source is dealing in visible light only and can generate pulses in 100 Hz ranges, the number of the ranges in visible light is about 3.5 trillion. With 3 of the ranges required for LO measurements per Objects, over 1 trillion unique LO tags are possible.

Solution B—The RFW generates a very bright pulse. The pulses will be of very short duration, so little power is required to make a very bright "white" pulse. If visible light is used, there are about $3.5 \times 10^{14}$ different frequencies (per second) to chose from, more than enough for unique IDs.

The third method to identify the reference points associated with a given target nDL is by Activated nDLs. The source, typically an RFW or PID to activate the Object's nDL. The source can have a laser or radio signal that causes the Object's nDL to become available.

The source can determine the LO of the target from the time of flight of the retroreflected radiant energy from each of the three retroreflectors in the target's 2DL.

The source can illuminate a group, or all, of the targets at once and determine the LO and ID of one by attending only to its unique pattern of modulation for a duration sufficient to do so.

The source can illuminate one or a group of the Objects at once, providing a signal unique to the widowed nDL retroreflector. When the retroflective tag detects the uniquely patterned signal, it turns on its windows' modulation for a duration sufficient for the source to LO and ID it. Alternatively, the source can tell the windowed nDL retroreflector when to turn off. For a LOID that turns on only when it receives a unique code, each of its three retroreflectors need only have a very simple modulation to tell the three apart.

It takes very little power to drive LCDs, for example, (as they don't need to be backlit). The power to drive the LCD windows can be derived from the direct illumination from the source's laser or collected from ambient light via a photovoltaic cell, possibly stored by a tiny battery (for applications where the direct illumination is too fleeting or non-existent). The electrical signal that drives the LCD (or window technology) can also be used to increase or decrease the effective size of the window. Increasing the size helps to increase the return signal's amplitude when needed, decreasing the window's size localizes the point better.

The fourth method to identify the reference points associated with a given target nDL is by Intervallic Target Reference Point Response. First a source reference frame (2DL, 3DL, RFW) reference point emits a query signal. A target (2DL, 3DL, RFW) reference frame receives the query signal. The receipt by the target of the source's query starts the target's timer. After a first interval, one of the target's reference points responds. (The first interval may be zero or positive.) After a second interval, a second of the target's reference points responds, etc. . . . for all of the target's reference points. The order of response of the target reference points and the lengths of the intervals are known to the source. The order of response informs the source as to which target reference point is at which distance. For this to always work, the intervals must be long enough that the $n^{th}$ response will always arrive before the $(n+1)^{th}$ response. Based on the information, the source can calculate the range of each of the target's reference points.

In situations requiring double modulation, the source may use Intervallic Querying to distinguish the source's reference points. Here, a first source reference point may query all of the target's reference points. Then a second source reference point may query all of the target's reference points, etc until all of the source's reference points have queried all of the target's reference points.

For all Intervallic methods, the source's query signal may or may not be the same type of radiant energy as the target's response energy.

Examples of target reference point responses follow. A target reference point response may be the emission of radiant energy. A response may be opening and closing (or just closing one that is already open) of a target reference point's retroreflector window. When retroreflectors are used, the source reference point will need to illuminate the retroreflectors during the time interval needed for all of the retroreflectors to respond or during the intervals when each one may be responding. The query signal may or may not be the same as the retroreflectors' illumination.

The order of target reference point response and the intervals between the responses can be known to the source by any of many techniques. All or part of the information may be a standard for all targets, for all targets of the target's type, or a function of the target's ID. The source may tell the target all or part of the information. A third party may inform the target and the source of all or part of the information. The target may inform the source of all or part of the information.

Using a standardized target, the target reference point response order information may not be needed. The source determines the locations of all of the target's reference points. From the locations, the source can calculate the distance between each of the target's reference points. The reference points of a 2DL form a right triangle. If the right triangle is scalene, the source can determine the identity of the target reference points from their distances from one another (the hypotenuse is always longest, the major axis line is the second longest, and the minor axis line is the shortest). Likewise, if the target is a 3DL, and the second arm off of the L is of different length from the other minor axis and the major axis, all four points can be distinguished. In these cases, the target's reference point response order is not needed. Likewise, if the target is an RFW whose arms are all of different length, each reference point can be distinguished by a source. The known distances between target reference points can be used to refine the LO information.

Just as Intervallic Target Reference Point Response can distinguish a target's reference points, Intervallic Target Response can distinguish between targets. If each target waits a specified and different interval before beginning its responses, only one target will be responding during a given time window and the source can know which target is responding by the window in which it is responding, as long as each target is allocated enough time for all of the target's reference points to respond.

The variable, $t_{ttr}$ (t sub ttr—"total target response time") represents the longest total time from the beginning of a target's response until all of the target's reference points have completed their responses. Because $t_{ttr}$ is quite short, there will not be problems with properly tracking all of the objects in a given DS unless there is a very large number of them or some are moving very quickly. Objects that need to be LOed more often than the time required to look at all of the objects in a DS may be allocated more than one window per cycle.

If the time that a target must wait for its window is great enough to cause sufficient drift in the target's clock to significantly reduce the accuracy of its LO determination, it can use an S2C t=0 signal to resynchronize.

Unlike S2C, Intervallic Target Reference Point Response, detailed above, is an expanded analog of time of flight calculation. Intervallic S2C Reference Point Activation uses intervals, like ITRPR, to distinguish a source's reference points, where the intervals are measured from the S2C t=0 signal. Negative, zero, and positive values will work as intervals here as long as there is a non-zero difference between the intervals In most of this disclosure, it has been assumed that the RFW is polling and/or listening over a wide solid angle at a given period of time and that multiple reference points are needed on an RFW. This will be a very useful approach for many applications.

For other applications, especially where the cost of nDLs (2DLs and/or 3DLs) must be absolutely minimized, other methods, described below, may be more cost-effective.

As described elsewhere herein, a PID, for example, can be used to select particular targets. Here, the PID (especially if based on a camera cell phone) can read an nDL to determine the object's LO and the 2D barcode attached thereto to determine its ID. This is excellent for manual applications. See the "LOIDs" section below for more information.

Here, the DS is monitored by a system that sequentially scans the DS. An example of such a system is described above, where a PID uses a rotating holographic optical element to scan a space and the time of flight of the laser is used to determine the range of a surface reflecting and/or retroreflecting the laser light. In this case, the PID is fixed, defining a DS. The LO of the laser beam in space at that instant and the range define a point in its DS. The scanner need not be part of a cell phone. In theory, only one of the scanners is needed. It is possible for the scanner's mounting to move as long as its changes in location and orientation are precisely monitored. However, the scanner will typically be fixed relative to the DS it scans. One fixed scanner may be unable to "see" some relevant objects due to blocking by intervening objects. In this situation more than one scanner may be used. This set of scanners may be located on the ceiling or high on the walls of a room. One or more of the multiple scanners may also scan other of the scanners to maintain precise interscanner LO relationship information, making the system of scanners an RFW. The scanners need not scan the same locations in the DS at the same time, especially when the objects are stationary or moving slowly relative to the scanners. As mentioned above, some scannable points most likely will not be scannable by every laser.

Laser rangefinding can be very accurate and precise. The data from scanning a point with more than one laser can be used to improve the accuracy of the location information of the point. One way to do this is to first map the points visible to each laser. A computer-based analysis can then determine which points are visible to two or more scanners. The points are then scanned, preferably "simultaneously", by those lasers that can "see" them. If there are differences (polarity, frequency, modulation, etc) in the beams of the lasers, sensors can tell where and to what extent the beams overlap on a given point. The data from the overlapping areas can be used to improve quality of the system's data on the point. Simple 1D or 2D barcodes (with known LO relative to the object on which they are affixed), preferably incorporated into a 2DL or 3DL and preferably retroreflective, are sufficient for a scanner-based system.

In processing the data from a scanned LOID (or other objects whose dimensions are known to the processor of the data), the LOID can be read. After the LOID is read, we know the LOID's dimensions, shape, etc. Applying the laws of perspective and scaling to the image data, we can further refine the LO information of the LOID. In this way, the LO information of a LOID can be determined without any ranging information. If all we are tracking is LOIDs, a scanning RFW laser does not have to have a ranging capability. As a LOID has a unique ID, it is easy for multiple RFW lasers to compare (and therefore improve) their data on each visible LOID. They can also use the parallax information to enhance the ranging of the LOID. A 2D grid on a LOID can help a scanning laser or video camera employ the laws of perspective to determine the range and orientation of the LOID. All of this also applies to a PID with a scanning laser.

Such a scanning system can be used to digitize the surfaces of objects, where simple reflection of the scanning beams is used, not necessarily retroreflection (though retroreflective paint could be applied to the surface). One application for this will be the scanning of the contours of a person's body to be used, for example, for the automated production of custom clothing.

As detailed above, the LO of a LOID can be deduced from processing the LOID's image and therefore measuring the range of each reference point on the LOID is not necessary. As an alternative (or supplement) to a laser-scanner based RFW, we can collect such image information via a video camera. Again, multiple cameras in different locations on a framework can easily compare their data to improve its accuracy and precision. A 7 megapixel digital camera (now offered to consumers) can resolve about 2 mm when viewing a 5 m×5 m area. One camera can be assigned a subset of the DS to increase resolution. The cameras may be fixed or move so as to scan different parts of the DS. Additional scanning can be achieved and additional ranging information can be deduced by comparing images created by changing the focus of the camera and by zooming it.

One (or more) video cameras may be assigned to monitor a wide angle looking for LOIDs of interest while others are assigned to zoom in to get very precise information on the LOIDs of interest.

The type of radiant energy used by source and/or target reference points may vary according to the application. IR is inexpensively modulated, transmitted, received, and decoded in remote controls for household electronics, but its range is limited. Radio signals have a longer range and can also be inexpensively modulated, transmitted, received, and decoded. Visible light can have a good range with minimal reflections and is not regulated by the FCC.

S2C applications require some form of sound and other applications may use sound instead of EMR. Again the type used depends upon the application. Low frequency sound can have a long range and can penetrate many solids. This is desirable in some applications, not others. Audible frequencies may be disturbing, but we will use such short bursts that they may not be noticeable. Ultrasound is inaudible but of limited range.

Typically herein are described methods to determine Location, Orientation, and ID for all objects. This has been done because it is generally more difficult to ascertain all three. However, there will be many applications where only one or two of the variables will be necessary. Often that will substantially simplify the implementation.

A LOID is any tag affixed to an object that may or may not be used to determine the object's ID, but necessarily can be used to determine the object's location and/or orientation.

An nDL is a LOID that may or may not be used to determine the ID of an object.

LOIDs of different size or configuration can be distinguished by a different reference point pattern or a different ID or ID type. For example, larger LOIDs may be desired for larger objects that can be "read" over greater distances and smaller ones for smaller objects.

If an object is articulated or in some other way has external parts that move with respect to one another, it may be useful to have unique LOIDs on the parts.

In principle, a barcode can be used as a LOID. Because a barcode (1D and 2D) has an inherent orientation, it can act as a LOID without also having an nDL. Some barcodes are in a standard location and in a standard orientation on an object. To use a barcode (or other ID or marker) as a LOID, the exact location and orientation of the barcode relative to the object it is on needs to be determined by the reader of the barcode and either used by the reader or transmitted to a device that will use the information. To my knowledge, current barcode and other tag readers do not do this. Furthermore, the LO of the barcode relative to the barcode reader needs to be known or determined. To be generally useful, the LO of the barcode reader (often mobile) relative to some DS should be known. The barcode mappings may be used to accurately determine the location and/or orientation (and hence boundaries) of the object to which it is affixed. The exact location and/or orientation information of the tag relative to the Object may be a standard for the object or the type of object. The information may be specific to the particular instantiation of the object, in which case the information may be supplied via the barcode or via some third party (e.g. a lookup table on a computer or website). A second barcode may be added that provides the LO information mapping the ID barcode to the object to which it is affixed.

It will often be useful to place more than one LOID on an object, so that at least one can be "seen". The multiple LOIDs must be distinguishable from one another unless orientation information is not needed, such as when the object exhibits the same symmetry at each LOID placement. Different barcode information (in systems where barcodes are read), for example, on each of the multiple LOIDs will be sufficient to distinguish them.

The better a LOID reader (RFW, PID, etc) knows the geometry of the surface of a LOID, the better it can use the geometry information to refine the LO information of the LOID relative to its reader. Generally, the LOID will be a label that conforms to the surface on which it is mounted. Care must be taken so that such LOIDs are not stretched or otherwise deformed during placement. Generally a LOID will be assumed to be mounted on a flat surface. It will help if the surface is very flat. Likewise, a LOID may be on a surface of a different shape, such as a sphere or cylinder. The information defining the shape can be known to the LOID reader via methods described elsewhere herein.

Current barcode readers can be enhanced to use a barcode as a LOID. Firstly, the barcodes must be in a known LO relative to the Object to which they are affixed. This is already done for some objects. Secondly, barcode readers will need to determine the LO of the barcode relative to the reader. The laws of perspective applied to the relative spacing of the lines (and length of the lines) (1D) or dots (2D) of the barcode can be used to determine orientation of the barcode relative to the barcode reader. The relative size of the barcode's "image" can be used to determine its range. Where the barcode reader is fixed with respect to a DS it is relatively easy to map the barcode reader's LO to the DS. If the barcode reader is mobile, a way to monitor the changing mapping needs to be employed.

A PID with a scanner or video camera can perform all of the functions necessary to make it a LOID-enabled barcode reader. The ranging laser on a PID can more precisely determine the barcode's range. Its video camera can more precisely determine the lengths of a ID barcode's lines.

Just as barcodes can be used as LOIDs, so too can RFIDs to the extent that their orientation and location can be precisely determined. If this is not currently practical RFIDs can be designed where it is practical. A simple way to accomplish this is to mount an RFID in an LO fixed with respect to a 2DL or 3DL, with the LO information known to systems reading the LOID. Here the 2DL or 3DL may emit, reflect, or retroreflect, EMR such as radio waves, visible light, IR, etc or sound. NOTE: Any ID system may be combined with a 2DL or 3DL to make it a LOID.

Holograms are very frequency- and angle-dependent. The angular dependence can be used to make LOIDs that assist in the accurate measurement of the orientation of the LOID. For purposes of clarity, the LOID will be assumed to be on a planar surface. The LOID's orientation is most easily considered as the direction of the plane's normal. (More complex shapes just have more than one significant normal.) LOID applications will use holograms that appear different for each orientation of the altitude and azimuth (for example) of the illuminating laser. The hologram can return, in the direction of the laser, a code incorporating both the altitude and the azimuth values or two separate codes, one for the altitude and one for the azimuth. The code's image is embedded in the hologram and projected back toward the laser's source when illuminated by a laser of the proper frequency. The result is that now, instead of computing or deducing the orientation of the LOID, that information can be directly read, by a person and/or a machine. The codes can be in nearly any visual format, most useful will probably be a barcode format, easily read by a sensor or video camera (most likely the one that will read the LOID's ID) or a textual format that can be read by a PID user.

The production of holograms is known in the art and they can be computer generated. Likewise, such holograms can be inexpensively mass produced. It may be useful to have a single hologram project both altitude and azimuth information or separate holograms, one for altitude and one for azimuth. The hologram-based LOID does not require 2DL or 3DL-style reference points. Much of the entire hologram may be retroreflecting, but may be too big to use for optimal ranging. It may be useful to have a distinct retroreflecting point on the hologram to be used for ranging. Alternatively, if the laser spot is small relative to the LOID, the hologram can also return the value (x and y (and z if not planar)) of the location on the hologram that is being illuminated.

In general, it will be cost-effective to embed a product-specific ID in the hologram, but not cost-effective to embed an ID specific to each instantiation of the product in the hologram. It may be useful, however, to mount a visual ID, such as a barcode (with a clear backing or ID printed) over a hologram portion that is retroreflective in order to improve the ID's visibility. This barcode may, for example, provide the instantiation-specific ID.

The sensitivity, and hence resolution, of the hologram may be enhanced by making the view dependent on the polarization of the illuminating laser beam.

Generally LOIDs have been described herein as requiring the locations of three reference points as this is the general and most complex case. If the object in question is axially symmetric, for example, only two reference points, along the axis, are needed. The information needed for a LOID also varies with constraints on the object's movement. Monorails and trains, for example, can either go one way or the other on their track. Cars generally do not travel in the direction normal to the road. Thus, under normal conditions, a LOID for such devices needs fewer reference points than provided by a 2DL or 3DL Herein, the PID or RFW are referred to as performing various computational and/or data storage functions. This is meant as a shorthand reference to whatever is performing the functions. Some or all of them may be performed by a microprocessor-based computer system dedicated to the DS. Some or all of them may be performed by a PC. In any case, an RFW will most likely be linked to a PC either by a wired or wireless connection.

A computer (or other device) can allow DSs to communicate with each other and with system users. A computer link allows a user to specify objects to track and the frequency of the tracking. Software can be used to predict collisions between objects or plan for the safe coming together of objects in the DS. A computer link can allow a user to direct the system to report any sightings of a particular object or type of objects.

The term "dot" has been used herein to refer to the image of the PID's laser. This term has been used to simplify the understanding of the PID. In its simplest embodiment, a dot is just that, small spot, typically in the center of the display's frame or a Frame for an Item. However, it is the intention of this invention to not limit the PID's laser's image thus. For example, two dots can define center and vertical axis and/or four dots can point to the corners of the display's frame or a Frame for an Item. Likewise, four lines can draw the display's frame or a Frame for an Item. The PID can automatically change the deflection angle with zoom and/or changes in range to maintain the frame exactly around the camera's field or said Item.

In most situations there is a surface to image the bottom and bottom two corners of the display's frame. If the display's "frame" is a grid with a horizontal (and optionally vertical) line in the middle of the display's frame, it will be easy to visually extrapolate the top line and top corners of the display's frame, where there is no surface for them to be displayed upon.

The PID is configured such that the user has the option for the laser to go off when the shutter is activated, so that it will not appear in the photo.

Figure 8:
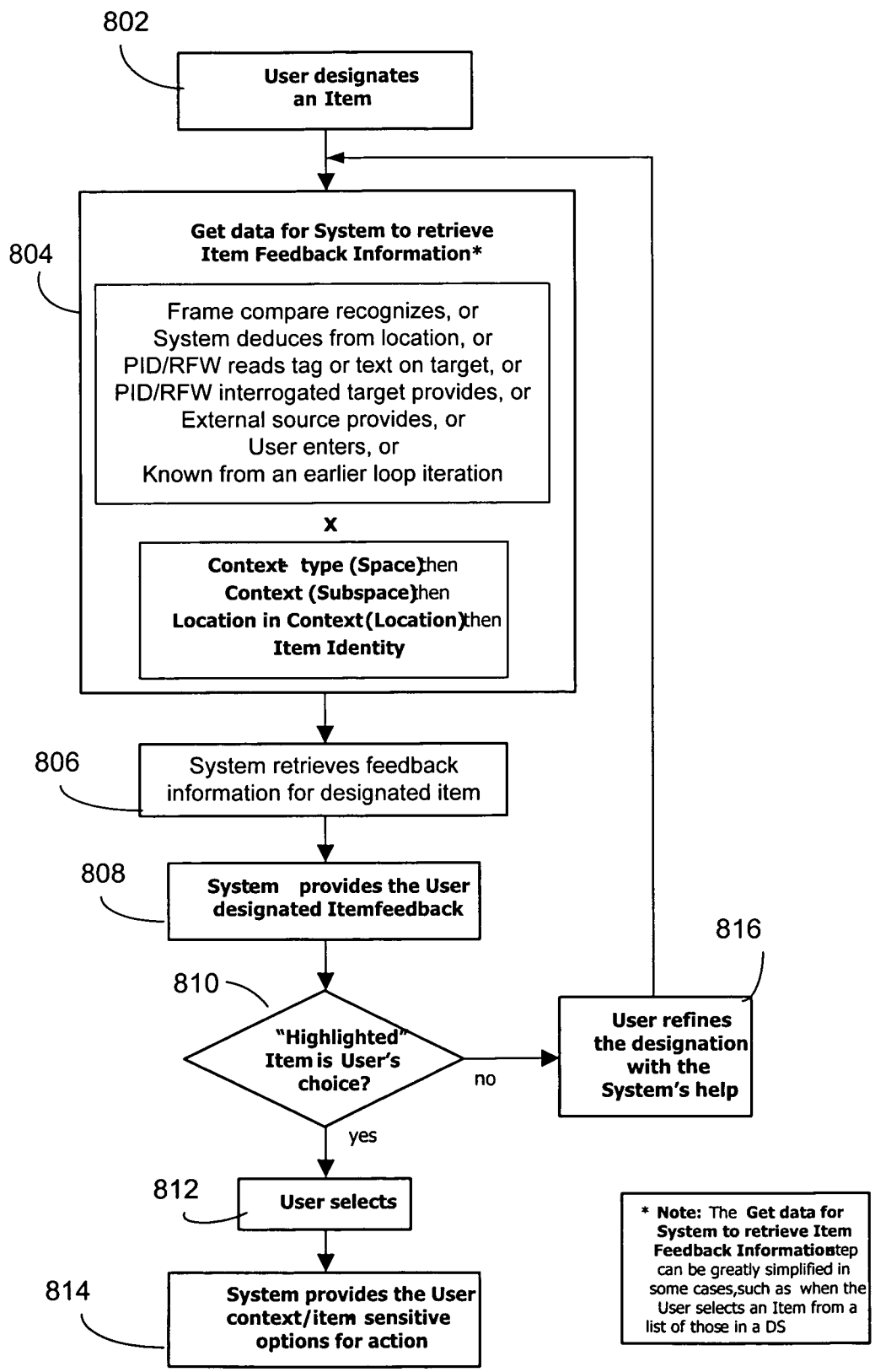
FIG. 8 is a flow chart showing an overview of the process of selecting and identifying an item.

An overview of a process using the above components will now be set forth with reference to the flow chart of FIG. 8. There are two main steps in the PID process of Selecting and Identifying Items to Act upon Them. First, the User selects an Item, then the User acts upon that selection.

The selection process has three main steps. Via the first step, shown in FIG. 8 as step 802, the User designates the Item. The second, shown as steps 804, 806, and 808, is that the PID System provides the User feedback as to what the System ascertains the User has designated. Thirdly, the User has the option to respond to the PID System's feedback, shown as steps 810, 812, 814, and 816.

The instant invention provides four methods for the User to designate an Item (step 802).

The first method for the User to designate an Item is "pointing". Here the User aims the directional sensor/effectors of a designator (a PID or RFW) at the Item or its image. If the designator is a PID, the User points the PID's laser and/or reticle at the Item. The Item may or may not be in a Digital Space (DS). In one mode, the designator can search for specific Items or Items matching certain characteristics. If the designator is an RFW, the user is stationed at a controller for the RFW. This may be a computer or a portable device such as a PID in communication with the RFW's controller. The RFW can cause a pointer to move at the User's command. The User can use 3D mouse to point at a spot in the RFW's DS and thereby can sweep the DS.

The second method for the User to designate an Item is to "Lookup" the Item in the RFW's database, which manages the Items in the RFW's DS. In an RFW, the User can designate an Item or group of Items in the RFW's database by several alternative means. The User can enter a location or a set of locations in the RFW's DS. For example, a User can ask the RFW's controller to designate all Items within a given radius of a given location or a given Item. The User can select one or more Items from a list of Items in the DS. The User can search the RFW's database of Items based on Item characteristics.

The third method for the User to designate an Item is employed when the User is a robot. This too represents a search for Items in the RFW's database. A robot, for example, may designate to the RFW "any Item in the RFW's DS (and/or nearby ones) that it is likely to collide with said robot in a given time frame if it and Items remain in same location, velocity, acceleration, etc".

The fourth method for the User to designate an Item is termed "For Later Use". Here the User enters a set of constraints into PID or RFW controller to be acted upon when those constraints are met. For example, the PPD keeps track of its location and informs the User that s/he is at or near a Whole Foods where the User has earlier informed the PID s/he needs to get eggs.

Once the User has designated an Item or Items, the System provides the User Feedback on the designated Item(s). In step 804, the data are obtained to allow the system to retrieve the item feedback information. Such data can be, for example, from frame compare recognition, system deduction from location, a tag or text on or otherwise associated with the target, data provided from an interrogated target (e.g., RFID), data provided from an external source, data entered by a user, or data known from an earlier loop iteration. From the context type, the context can be derived; from the context, the location in the context can be derived; and from the location in the context, the item identity. In step 806, the system retrieves the feedback information from the designated item, and in step 808, the system provides such feedback information to the user.

Some elements of the Item feedback are typically associated with a given Designation Type. If the designation type is "Pointing", the System hypothesizes which Item the User has selected. If the application is efferent, e.g. a mouse application, typically the mouse drivers on the computer hypothesize the item designated. There are many ways to do this including Frame Compare. For afferent applications, Frame Compare is typically used. The System provides feedback on the hypothesized designated Item to User.

When the Designation type involves a search or lookup in a database, the System looks up the feedback information in the RFW's database and provides the feedback on the designated Item to User.

Following are types of Item feedback that are independent of the Designation Type.

The System may cause the Item's image to be "highlighted". The System may provide textual or audio feedback on Item, such as: the ID of Item; the name of Item; and/or a description of Item.

The System will provide the User with Item Feedback when a For later use condition has been met and may inform the user as to the nature of how it has been met and how to access the Item. For example, a PID may inform User that s/he is within a given proximity of a store that has the Item of interest or that the Item of interest is now on sale.

The System provides the requested data to the robot or semi-autonomous device.

As further specified in following paragraphs, once the feedback information is provided, the User responds (optional, but typical), to the System based upon the feedback. If it is determined in step 810 that the "highlighted" item is the user's choice, then in step 812, the user selects the item in step 812, e.g., by clicking on the appropriate PID button, and then, in step 814, the system provides the user with context/item-sensitive options for action. Otherwise, in step 816, the user refines the designation with the system's help, and the process returns to step 804.

If the User is a robot, the robot determines whether or not to act on the data. The robot might determine that the Item is something it wants to interact with, ignore, or avoid colliding with, etc. After responding to the Feedback, the robot will be offered options for Item-specific Actions.

If this is a For later use application, the User informs the System whether the User wants to act on the information now or be reminded later under predetermined or newly entered conditions. Then, the User is offered options for Item-specific Actions.

For other applications, there are two main paths. In the first, the User determines that the designation process is complete (that is, a "yes" answer in step 810). Here, the User selects from a list of Item-specific Actions. These actions may include the options to quit or start over.

The second path of response to the System's Item Feedback indicates that the User does not consider the designation process complete (that is, a "no" answer in step 810). Here the User may move parallel on the search tree, for example, by moving the pointer outside boundaries of designated Item or otherwise informing the system that the desired Item is not the designated Item or a subset thereof.

Alternatively, the User will move deeper in the search tree to refine the search.

The User has several search refinement options. The User may do a Click Up or Click Down. The User may employ the Polygon Vertex Method, the Separator Point Method, or the method detailed in the Frame Compare section of this Application to refine the designation of the subarea. Alternatively, the User may select an Item from a list or from the results of a search of a DS database.

After the User refines the search by moving parallel on or deeper into the search tree, the System again provides Feedback on designated Item(s). This Feedback loop continues until the User selects an Item, looses interest, or starts over.

Various Item designation means will now be discussed.

The User may designate and Item by pointing at the Item or its image. A particularly useful way to do so is with a laser (see FIGS. 1A and 1B). Besides Item designation, a laser can have additional uses that provide a synergy to the product. The laser can be used to determine the range and orientation of the Item. Modulation of the laser's beam can be used to identify the PID or used for communications, such as between PIDs or to communicate with, query, and/or control the Item. The laser's beam can be used to activating devices such as LOIDs and transmitters. The laser's beam can be used to power devices, such as LOIDs and transmitters. Pointing can also be achieved by a reticle in a camera's viewfinder (see FIGS. 3A and 3B). Also, a laser may be combined with a reticle (see FIGS. 5A and 5B).

Outlines or boxes can be used to designate a subarea of the viewed area. These can be used to directly designate an Item in space or on the image of the Item, for example, on the designator's or another screen. Types of boxes include polygons, circles, and ellipses in 2D space and parallelepipeds, spheres, or ellipsoids in 3D space. Outlines may be drawn around the object via a pointer or on its image on screen—via mouse a (2D, 3D), stylus, etc.

Item designation in imaging RFWs and non-imaging (blind) RFWs may be direct or indirect. In direct designation, the user points directly at the Item via a simple PID pointer. In indirect designation, the user may view the Item in a monitor and designates via a 3D mouse or the user finds the Item in a list objects in RFW's DS and chooses from that list or the user finds the Item in a list returned by a search of DS's database via constraints.

RFWs have other valuable properties including the fact that an RFW defines a Digital Space (DS). There are two main types of RFWs, Dedicated RFWs and General RFWs.

A Dedicated RFW monitors a limited space, typically a space associated with a specific context-type, such as a TV screen or computer screen. Examples of Dedicated RFWs include Sensor Arrays as illustrated in FIGS. 6 and 7 and Dedicated Cameras. With a Dedicated Camera, a digital camera, typically fixed, can be dedicated to monitor a single computer screen, for example to behave like a distant Sensor Array. During initialization, the mapping between the camera's pixel locations and locations on a frame's image is established. The image of the beam of a simple laser pointer with a button on said screen can directly define the pointed-to location on said screen. Its location can be chosen to minimize glare, blocking, etc.

A General RFW is one designed to monitor multiple objects. Prior Art examples of Dedicated RFW-like systems include GPS, RADAR, and SONAR based systems. Typically, a general RFW has, or has access to, a database that keeps track of all available information regarding the Items in its DS. This information may include location and identification information (unlike GPS, like RADAR). This information may include orientation information (unlike GPS, RADAR, SONAR).

An RFW may acquire the location and/or orientation information in many ways. An RFW can directly "read" this information from the object, unlike GPS, or the objects in the RFW's DS can inform the DS where they are.

A General RFW is excellent at managing lots of objects. It automatically keeps track of lots of things, including: individuals; vehicles; robots; and pretty much anything else.

A User can access the information on the Items in the DS via a computer or via a PID. Most recognition processing is local, except Show frame recognition (can be done by soundtrack).

Reference Points (RPs) are used mostly herein to implement RFWs, but in some cases used to implement a PID. Reference points may be directly or indirectly sensed. One indirect means to communicate with RPs is referred to as "Activate/listen". Here the target RP(s) is activated and the source RP "listens" for the RP's response. Activation means may be an omni-directional signal from the source RP activates the target RP or a narrow-beam signal from the source can activate the target RP or an RP can be self-activated. Another indirect means is "Designate/listen". Here a third party, such as a PID can designate the RP, e.g. by pointing its laser thereon. The "Source" RP then picks up the scattered light to collect the information on the LO of the target RP.

After the Item has been selected (step 812), the PID system presents Item-specific Action options to the User (step 814). The first type of Item-specific Actions includes getting more information on the selected Item. Types of information may comprise one or more of: the Item's ID; its location (absolute, relative, or in context); its orientation (absolute, relative); Item purchase-related information; and "Robotics-related" information.

Types of "Robotics-related" information on the Item comprise: Item surface characteristics, such as, its outline, pushing points, pulling points, lifting points, surface hardness mapping; volume characteristics, such as, its mass and/or its center of mass; the Item's propulsion characteristics, such as, its maximum acceleration and maximum velocity; and other additional information, such as, the locations of the Item's hard communications interfaces and its types of interfaces; the Item's uses and how to use it.

Sources for this information comprise: information directly from the target via a tag on, or associated with, the target or a transmitter on, or associated with, the target (laser, IR, LED, radio, ultrasound, etc); information not directly from the target: use any one or more of the other types of information described herein to look up the others in a database stored or accessible to the PID or RFW. This lookup may also be done via Frame Compare.

Another type of Item-Specific Action is to Purchase the Item. A PID may be equipped with a "Buy button", an actuation means which, when activated, automatically causes the User's pre-specified account to be debited for the purchase price and for the Item to automatically be shipped to the User's pre-specified address via the User's pre-specified means of shipping. The User may edit these options if desired before the order is activated.

Another type of Item-specific Action is to put the Item on a list for future action, a For Later Use application.

Another type of an Item-specific Action is to lead the user. Here, the PID knows the PID's location and the location where the User wants to go to reach or to see said Item. The PID points the way. This information can be used to direct a device, such as a vehicle, e.g. a wheelchair or a robot.

A final type of an Item-specific Action is for the System to cause the Item to do something. The PID or RFW system can cause the Item to perform some function that it has. For example, a designator may be used to point to a location where the User wants the Item to go.

Following is a discussion of refinement methods, called subarea designation techniques, which the user may use to further specify a subarea on a display or pointing at the object in space, with the purpose of delineating the desired Item from others in its proximity. The first subarea designation technique is the Separator Points Method, used designate Item by designating points at boundaries with other Items, either on screen or in space.

In Version 1 of the Separator Points Method, designating a point inside the boundary between a first Item and a second Item, selects the first Item. Designating a second point inside the boundary of a second Item, when possible, selects a higher level Item that includes both the first and second Items. When this is not possible, it selects two Items. Point designation toggles, i.e. designation of the same point twice turns off that point's designation status.

In Version 2 of the Separator Points Method, when one separator point is entered: if the point is inside the boundary of one Item and not near the boundary of another or if the point it is strongly inside the boundary of one Item, then, that Item is presumed; otherwise, the larger Item is presumed. When two separator points are entered: if both points are inside or outside, but near, the boundaries of a single Item, that Item is presumed; otherwise, the two Items are presumed. When three or more separator points are entered: each pair of separator points is evaluated by the rules for two separator points.

The second subarea designation technique is the Polygon Vertex Method, used to define a polygon around the Item by designating points on the screen or around the Item in space. The polygon "grows" as additional points are specified. The User can select the Item after any number of points. Designating one point defines the "center" of the Item. Designating a second point defines two diagonal corners of a level rectangle. Designating a third (and more) point(s) defines the vertices of a polygon (not necessarily a regular or convex polygon) with that number of sides. As points are designated, the polygon is drawn. In one mode, the System hypothesizes and "highlights" the Item only after the User has completed the polygon. In another mode, the System hypothesizes and "highlights" after each point is added. The entire Item does not need to be inside the polygon to be designated.

Subarea Designation feedback frequency modes comprise: Batch Mode, where the System hypothesizes and "highlights" the Item only after the User has completed the polygon; and Instant Mode, where the System hypothesizes and "highlights" after each point is added.

To designate a point: touch a touchscreen at the point with a stylus; move a mouse to and click at the point; employ a PID to point to spots around the Item in space or its image on a screen; etc.

Another Subarea Designation Technique is to "Draw" an outline around the Item or its image on a display with a stylus or mouse. A mouse, stylus, PID or other screen pointing device can stream data to provide a large number of points, in essence a curve, around the Item. This can also employ Batch or Interactive Feedback Frequency Modes, though in that case, the Feedback may occur after every nth point where n is greater than one or after a specified time interval.

While preferred embodiments have been set forth above, those skilled in the art who have reviewed the present disclosure will readily appreciate that other embodiments can be realized within the scope of the present invention. For example, numerical values are illustrative rather than limiting. Therefore, the present invention should be construed as limited only by the appended claims.

I claim:

1. A method for identifying an object, the method comprising:
   (a) providing a pointing and identification device for pointing at the object, the pointing and identification device comprising:
   at least one actuation means for actuation by the user when the user points the pointing and identification device at the object;
   a digital camera for forming a digital image of the object or of a portion of the object when the user points the pointing and identification device at the object and actuates the at least one actuation means; and
   a communication device for communicating the digital image to a different location when the user actuates the at least one actuation means;
   (b) communicating the digital image to the different location;
   (c) automatically identifying a list of likely pointed-to objects from the digital image at the different location to return the list of likely pointed-to objects; and
   (d) returning the list of likely pointed-to objects to the user to select one of the likely pointed-to objects;
   wherein the object is at least one of a spot on a displayed image on a display, a subarea of a space on the displayed image on the display, one of a plurality of objects in the displayed image on the display, an object in space, or near an object in space, a subarea of a surface in space, or one of a plurality of objects in space.

2. The method of claim 1, wherein step (c) comprises:
   (i) receiving a designation of the object as designated by the user;
   (ii) recording a frame image comprising the designated object;
   (iii) determining a context type of the frame image from the frame image; and
   (iv) identifying the object.

3. The method of claim 1, further comprising receiving a selection by the user of said one of the likely pointed-to objects as the object and an instruction from the user to obtain information on the object.

4. The method of claim 1, further comprising receiving a selection by the user of said one of the likely pointed-to objects as the object and an instruction from the user to purchase the object.

5. The method of claim 1, wherein the object is at least one of the spot on the displayed image on the display, the sub-area of the space on the displayed image on the display, and one of the plurality of objects in the displayed image on the display.

6. The method of claim 5, wherein the object is the sub-area of the space on the displayed image on the display.

7. The method of claim 1, wherein the object is a spot on a displayed image on a display.

8. The method of claim 1, wherein the object is a subarea of a space on the displayed image on the display.

9. The method of claim 1, wherein the object is one of a plurality of objects in the displayed image on the display.

10. The method of claim 1, wherein the object is an object in space, or near an object in space.

11. The method of claim 1, wherein the object is a subarea of a surface in space.

12. The method of claim 1, wherein the object is one of a plurality of objects in space.

* * * * *